United States Patent
Miller et al.

(10) Patent No.: US 12,122,028 B2
(45) Date of Patent: Oct. 22, 2024

(54) ELECTRONIC CLUTCH FOR POWERED FASTENER DRIVER

(71) Applicant: MILWAUKEE ELECTRIC TOOL CORPORATION, Brookfield, WI (US)

(72) Inventors: Arik A. Miller, Shorewood, WI (US); Jonathon R. Gasteiner, Brookfield, WI (US); Mitchell A. Ellena, West Allis, WI (US); Austin Gaspar, Maple Valley, WA (US); Robert Keys, Pewaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/319,098

(22) Filed: May 17, 2023

(65) Prior Publication Data

US 2023/0381938 A1   Nov. 30, 2023

Related U.S. Application Data

(60) Provisional application No. 63/346,160, filed on May 26, 2022, provisional application No. 63/477,442, filed on Dec. 28, 2022.

(51) Int. Cl.
| | | |
|---|---|---|
| *B25C 1/06* | (2006.01) | |
| *H02P 29/00* | (2016.01) | |
| *B25C 1/04* | (2006.01) | |

(52) U.S. Cl.
CPC .......... *B25C 1/06* (2013.01); *H02P 29/0027* (2013.01); *B25C 1/047* (2013.01)

(58) Field of Classification Search
CPC ........ H02P 29/0027; B25C 1/06; B25C 1/047
See application file for complete search history.

(56) References Cited

U.S. PATENT DOCUMENTS

| | | |
|---|---|---|
| 4,418,765 A | 12/1983 | Mori et al. |
| 4,503,370 A | 3/1985 | Cuneo |

(Continued)

FOREIGN PATENT DOCUMENTS

| | | |
|---|---|---|
| CN | 201349196 Y | 11/2009 |
| CN | 101786178 B | 10/2012 |

(Continued)

OTHER PUBLICATIONS

Extended European Search Report for Application No. 23174466.5 dated Oct. 24, 2023 (5 pages).

(Continued)

*Primary Examiner* — Nathaniel C Chukwurah
(74) *Attorney, Agent, or Firm* — Michael Best & Friedrich LLP

(57) ABSTRACT

Systems and methods for implementing an electronic clutch in a powered fastener driver. One fastener driver includes a motor, a trigger, a position sensor, a speed sensor, and a controller. The position sensor is configured to sense a position of the lifting assembly. The speed sensor is configured to sense a speed of the motor. The controller is configured to provide power to the motor. The controller is configured to receive speed signals from the speed sensor indicative of the speed of the motor, and determine whether the speed of the motor has dropped by a speed drop threshold within a first period of time. The controller is configured to activate an electronic clutch to electronically brake the motor for a second period of time. In response to the second period of time having passed, the controller is configured to provide power to the motor.

20 Claims, 20 Drawing Sheets

(56) References Cited

U.S. PATENT DOCUMENTS

| | | | |
|---|---|---|---|
| 5,410,229 A | 4/1995 | Sebastian et al. | |
| 6,604,666 B1 | 8/2003 | Pedicini et al. | |
| 6,700,341 B2 | 3/2004 | Schaer et al. | |
| 6,705,503 B1 | 3/2004 | Pedicini et al. | |
| 6,766,935 B2 | 7/2004 | Pedicini et al. | |
| 6,769,593 B2 | 8/2004 | Pedicini et al. | |
| 7,446,493 B2 | 11/2008 | Forster et al. | |
| 7,551,411 B2 | 6/2009 | Woods et al. | |
| 7,677,844 B2 | 3/2010 | Schell et al. | |
| 7,817,384 B2 | 10/2010 | Woods et al. | |
| 7,882,899 B2 | 2/2011 | Borinato et al. | |
| 8,047,415 B2 | 11/2011 | Kunz et al. | |
| 8,096,456 B2 | 1/2012 | Kunz et al. | |
| 8,132,702 B2 | 3/2012 | Kunz et al. | |
| 8,490,516 B2 | 7/2013 | Baba et al. | |
| 8,631,986 B2 | 1/2014 | Hlinka et al. | |
| 8,657,031 B2 | 2/2014 | Kononenko et al. | |
| 8,674,640 B2 | 3/2014 | Suda et al. | |
| 8,727,941 B2 | 5/2014 | Aoki | |
| 8,796,976 B2 | 8/2014 | Kusakawa | |
| 8,919,456 B2 | 12/2014 | Ng et al. | |
| D725,982 S | 4/2015 | Miller | |
| 9,193,055 B2 | 11/2015 | Lim et al. | |
| D750,460 S | 3/2016 | Miller | |
| 9,352,456 B2 | 5/2016 | Murthy et al. | |
| 9,505,097 B2 | 11/2016 | Aoki et al. | |
| 9,533,406 B2 | 1/2017 | Aoki | |
| 9,908,182 B2 | 3/2018 | Phillips et al. | |
| 10,011,006 B2 | 7/2018 | Sergyeyenko et al. | |
| 10,220,500 B2 | 3/2019 | Lim et al. | |
| 10,333,441 B2 | 6/2019 | Koniakowsky et al. | |
| 10,737,373 B2 | 8/2020 | Duncan et al. | |
| 10,786,891 B2 | 9/2020 | Noguchi et al. | |
| 10,850,380 B2 | 12/2020 | Huber et al. | |
| 11,130,218 B2 | 9/2021 | Hu | |
| 11,219,993 B2 | 1/2022 | Heimrich | |
| 2004/0232194 A1 | 11/2004 | Pedicini et al. | |
| 2006/0180631 A1* | 8/2006 | Pedicini | B25C 1/06 227/8 |
| 2011/0000688 A1 | 1/2011 | Iwata | |
| 2011/0030980 A1 | 2/2011 | Ho | |
| 2011/0303428 A1 | 12/2011 | Roth et al. | |
| 2013/0056236 A1 | 3/2013 | Morinishi et al. | |
| 2013/0068491 A1 | 3/2013 | Kusakawa et al. | |
| 2013/0327552 A1 | 12/2013 | Lovelass et al. | |
| 2014/0284070 A1 | 9/2014 | Ng et al. | |
| 2015/0298308 A1 | 10/2015 | Kato | |
| 2016/0031072 A1 | 2/2016 | Lim et al. | |
| 2016/0354888 A1 | 12/2016 | Huber et al. | |
| 2017/0217004 A1* | 8/2017 | Kato | B25C 5/15 |
| 2018/0154456 A1 | 6/2018 | Phillips et al. | |
| 2018/0318999 A1 | 11/2018 | Lovelass et al. | |
| 2019/0047133 A1 | 2/2019 | Beckert et al. | |
| 2019/0118362 A1 | 4/2019 | Greunke et al. | |
| 2019/0134801 A1 | 5/2019 | Merget et al. | |
| 2020/0114500 A1 | 4/2020 | Bierdeman et al. | |
| 2020/0331136 A1 | 10/2020 | Duncan et al. | |
| 2021/0039231 A1 | 2/2021 | Araki et al. | |
| 2021/0078151 A1 | 3/2021 | Huber et al. | |
| 2021/0078153 A1 | 3/2021 | Sunabe et al. | |
| 2022/0001522 A1 | 1/2022 | Duncan et al. | |

FOREIGN PATENT DOCUMENTS

| | | |
|---|---|---|
| CN | 108000440 A | 5/2018 |
| CN | 207309881 U | 5/2018 |
| CN | 220373192 U | 1/2024 |
| CN | 220551229 U | 3/2024 |
| DE | 10348756 B4 | 1/2011 |
| EP | 3912763 A1 | 11/2021 |
| WO | 2018003370 A1 | 1/2018 |
| WO | 2019000379 A1 | 1/2019 |
| WO | 2021016437 A1 | 1/2021 |

OTHER PUBLICATIONS

Chinese Patent Office Action for Application No. 202321297586.3 dated Jun. 7, 2024 (3 pages including statement of relevance).

* cited by examiner

ELECTRONIC CLUTCH FOR POWERED FASTENER DRIVER

RELATED APPLICATIONS

This application claims the benefit of U.S. Provisional Patent Application No. 63/346,160, filed May 26, 2022, and U.S. Provisional Patent Application No. 63/477,442, filed Dec. 28, 2022, the entire content of each of which is hereby incorporated by reference.

SUMMARY

Embodiments described herein provide systems and methods for implementing an electronic clutch in a powered fastener driver.

Fastener drivers described herein include a motor, a trigger, a lifting assembly, a position sensor, a speed sensor, and a controller. The lifting assembly is operable to be moved by the motor. The position sensor is configured to sense a position of the lifting assembly. The speed sensor is configured to sense a speed of the motor. The controller is connected to the trigger, the motor, the position sensor, and the speed sensor. The controller is configured to provide, in response to actuation of the trigger and based on the position of the lifting assembly, power to the motor, receive speed signals from the speed sensor indicative of the speed of the motor, determine whether the speed of the motor has dropped by a speed drop threshold within a first period of time, activate the electronic clutch, in response to determining that the speed of the motor has dropped by the speed drop threshold within the first period of time, to electronically brake the motor for a second period of time, and provide, in response to the second period of time having passed, power to the motor.

In some aspects, the controller is further configured to determine, based on the speed of the motor and a speed command signal, a torque value at which to drive the motor, compare the torque value to a torque-velocity-current look-up table, determine, based on the comparison, a current value to provide to the motor, and provide the current value to the motor to drive the motor.

In some aspects, the fastener driver further includes a current sensor configured to provide current signals indicative of a current of the motor. The controller is further configured to receive, from the current sensor, the current signals indicative of the current of the motor, determine a pulse width modulation (PWM) duty cycle ratio based on the current of the motor and the current value, and drive the motor according to the PWM duty cycle ratio.

In some aspects, the controller is further configured to set a position command used to drive the motor to a first position command when the lifting assembly is at a first position, set the position command to a second position command when the lifting assembly is at a second position, and set the position command to a third position command when the lifting assembly is at a third position.

In some aspects, the controller is further configured to compare the position command to the position of the lifting assembly sensed by the position sensor and provide, in response to the position of the lifting assembly being less than the position command, power to the motor.

In some aspects, the controller is further configured to determine a torque limit based on the position of the lifting assembly and control the motor based in part on the torque limit.

In some aspects, the fastener driver further includes a temperature sensor configured to provide temperature signals indicative of a temperature of the lifting assembly. The controller is further configured to receive, from the temperature sensor, the temperature signals indicative of the temperature of the lifting assembly and determine, based on the speed signals and the temperature signals, a torque value at which to drive the motor.

In some aspects, the controller is further configured to detect a high load state of the motor based on the speed of the motor and limit, in response to the high load state of the motor, a torque value at which to drive the motor.

In some aspects, the controller is further configured to drive, in response to the second period of time having passed, the motor according to a low speed setting for a third period of time.

In some aspects, the controller is further configured to electronically brake the motor in response to the third period of time having passed.

Methods for operating a fastener driving including an electronic clutch described herein include providing, in response to actuation of a trigger and based on a position of a lifting assembly, power to a motor, receiving speed signals from a speed sensor indicative of a speed of the motor, determining whether the speed of the motor has dropped by a speed drop threshold within a first period of time, activating the electronic clutch, in response to determining that the speed of the motor has dropped by the speed drop threshold within the first period of time, to electronically brake the motor for a second period of time, and providing, in response to the second period of time having passed, power to the motor.

In some aspects, the method further includes determining, based on the speed of the motor and a speed command, a torque value at which to drive the motor, comparing the torque value to a torque-velocity-current look-up table, determining, based on the comparison, a current value to provide to the motor, and providing the current value to the motor to drive the motor.

In some aspects, the method further includes receiving, from a current sensor, current signals indicative of a current of the motor, determining a PWM duty cycle ratio based on the current of the motor and the current value, and driving the motor according to the PWM duty cycle ratio.

In some aspects, the method further includes setting a position command used to drive the motor to a first position command when the lifting assembly is at a first position, setting the position command to a second position command when the lifting assembly is at a second position, and setting the position command to a third position command when the lifting assembly is at a third position.

In some aspects, the method further includes comparing the position command to the position of the lifting assembly, and providing, in response to the position of the lifting assembly being less than the position command, power to the motor.

In some aspects, the method further includes determining a torque limit based on the position of the lifting assembly and controlling the motor based in part on the torque limit.

Power tools described herein include a motor, a lifting assembly, a speed sensor, a position sensor, and a controller. The lifting assembly is operable to be moved by the motor. The speed sensor is configured to sense a speed of the motor. The position sensor is configured to sense a position of the lifting assembly. The controller is connected to the motor, the speed sensor, and the position sensor. The controller is configured to drive, based on the position of the lifting assembly, the motor according to a first speed setting, receive speed signals from the speed sensor indicative of the speed of the motor, determine, while in the first speed setting, whether the speed of the motor is greater than or equal to a speed threshold, drive, in response to the speed of the motor being greater than or equal to the speed threshold and based on the position of the lifting assembly, the motor according to a second speed setting, determine, while in the second speed setting, whether the speed of the motor is less than the speed threshold, and activate the electronic clutch, in response to determining that the speed of the motor is below the speed threshold, to drive the motor at a low current command for a first predetermined time period.

In some aspects, the controller is further configured to drive, in response to the first predetermined time period having passed and based on the position of the lifting assembly, the motor according to the first speed setting.

In some aspects, the controller is further configured to drive the motor according to the first speed setting for a second predetermined time period and drive, in response to determining that the second predetermined time period has passed, the motor at the low current command for the first predetermined time period.

In some aspects, the controller is further configured to determine a torque limit based on the position of the lifting assembly and control the motor based in part on the torque limit.

Additional fastener drivers described herein include a motor, a trigger, a lifting assembly, a position sensor, a speed sensor, and a controller. The lifting assembly is operable to be moved by the motor. The position sensor is configured to sense a position of the lifting assembly. The speed sensor is configured to sense a speed of the motor. The controller is connected to the trigger, the motor, the position sensor, and the speed sensor. The controller is configured to detect actuation of the trigger, drive, in response to actuation of the trigger, the motor according to a maximum speed command for a first period of time, drive, when the first period of time is satisfied, the motor based on the position of the lifting assembly, receive speed signals from the speed sensor indicative of the speed of the motor, determine whether the speed of the motor has dropped by a speed drop threshold within a first period of time, activate the electronic clutch, in response to determining that the speed of the motor has dropped by the speed drop threshold within the first period of time, to electronically brake the motor for a second period of time, and provide, in response to the second period of time having passed, power to the motor.

In some aspects, the controller is further configured to set a position command used to drive the motor to a first position command when the lifting assembly is at a first position, set the position command to a second position command when the lifting assembly is at a second position, and set the position command to a third position command when the lifting assembly is at a third position.

In some aspects, the controller is further configured to compare the position command to the position of the lifting assembly sensed by the position sensor and provide, in response to the position of the lifting assembly being less than the position command, power to the motor.

In some aspects, the controller is further configured to determine, based on the speed of the motor and a speed command signal, a torque value at which to drive the motor, compare the torque value to a torque-velocity-current look-up table, determine, based on the comparison, a current value to provide to the motor, and provide the current value to the motor to drive the motor.

In some aspects, the fastener driver further includes a current sensor configured to provide current signals indicative of a current of the motor. The controller is further configured to receive, from the current sensor, the current signals indicative of the current of the motor, determine a PWM duty cycle ratio based on the current of the motor and the current value, and drive the motor according to the PWM duty cycle ratio.

Before any embodiments are explained in detail, it is to be understood that the embodiments are not limited in application to the details of the configurations and arrangements of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other features and aspects will become apparent by consideration of the following detailed description and accompanying drawings.

DETAILED DESCRIPTION

Figure 1A:
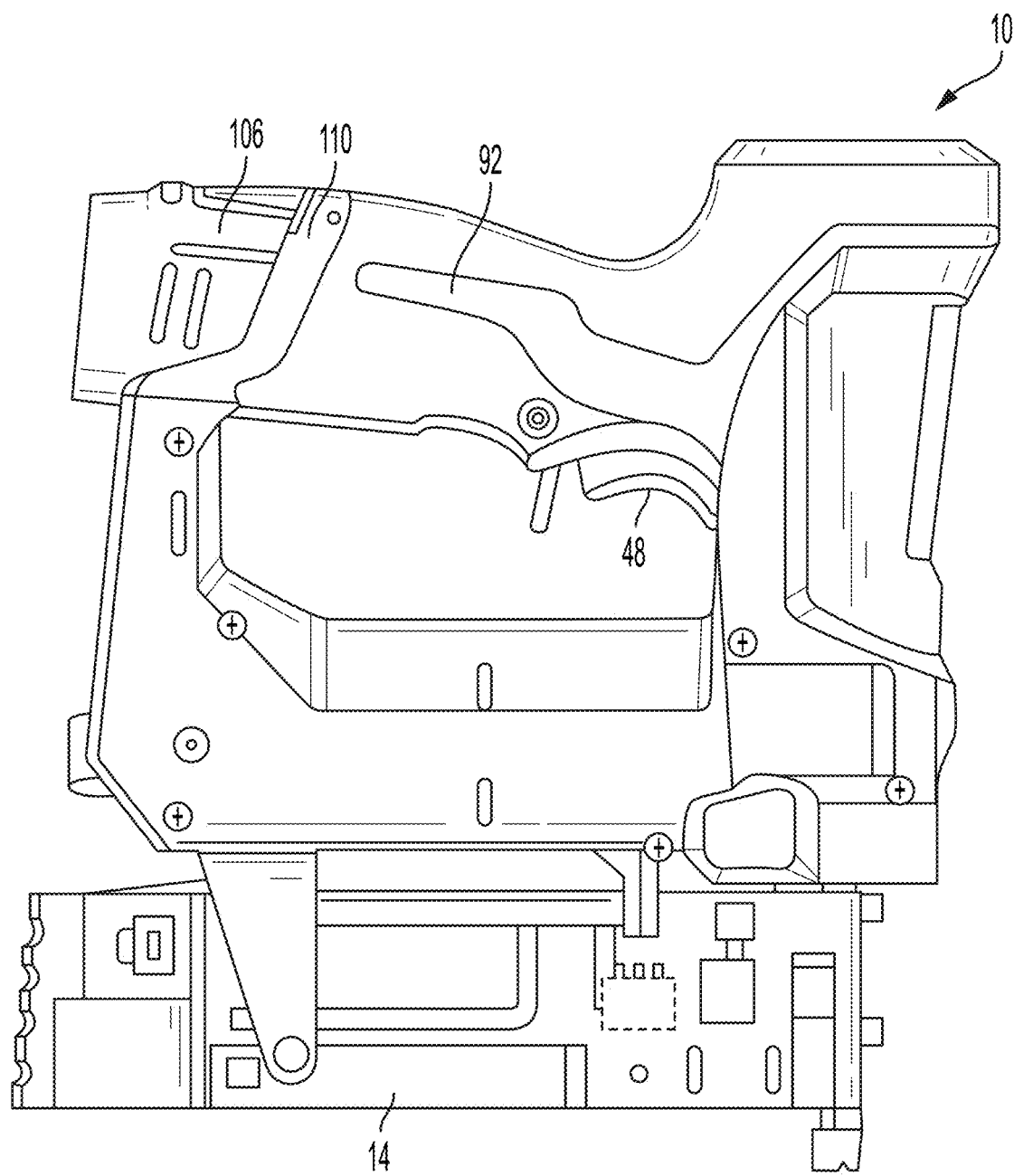
FIG. 1A illustrates a side view of a powered fastener driver in accordance with embodiments described herein.
Figure 1B:
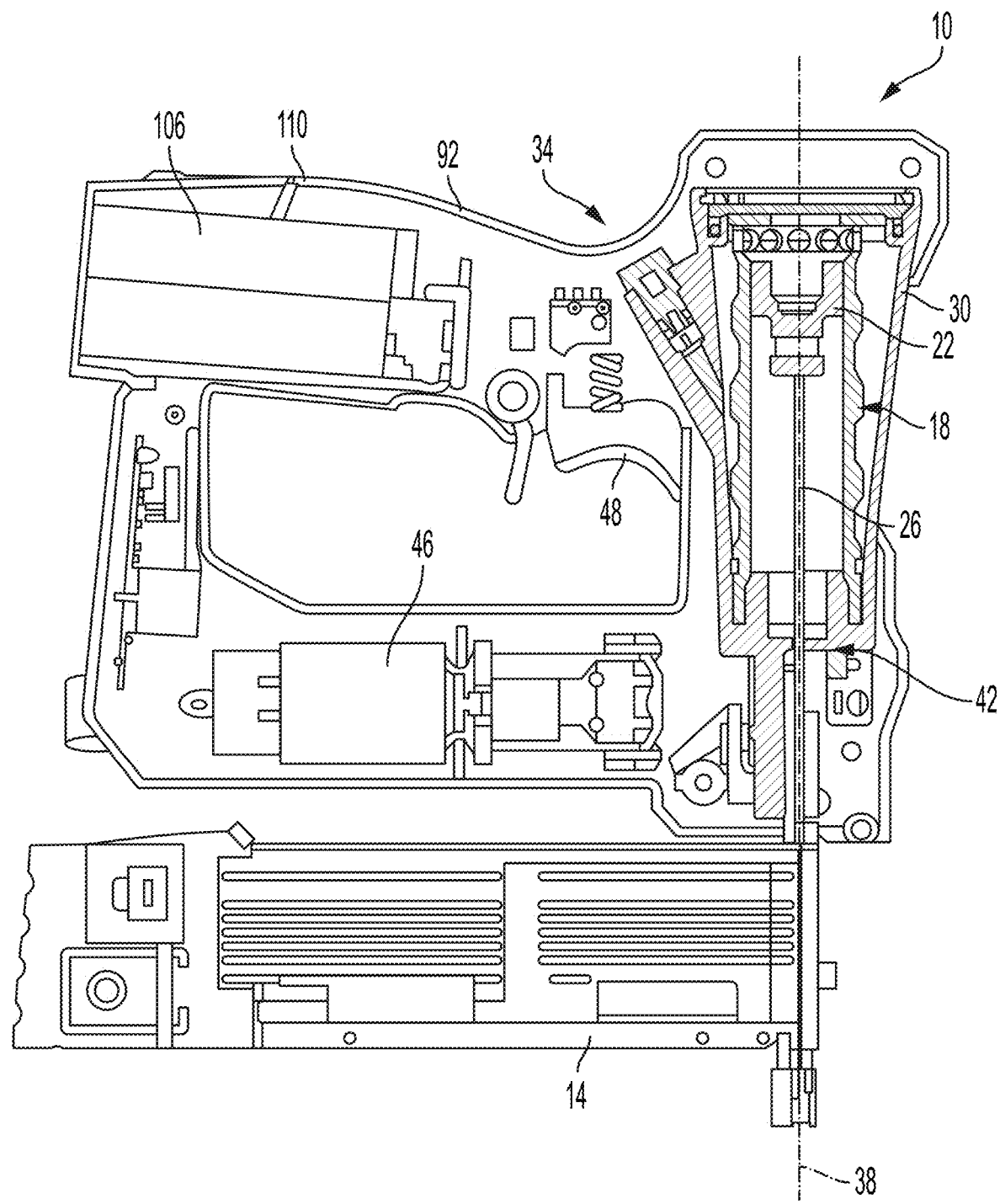
FIG. 1B illustrates a cross section of the fastener driver of FIG. 1A, with the housing removed, in accordance with embodiments described herein.

FIGS. 1A and 1B illustrate a powered fastener driver 10 operable to drive fasteners (e.g., nails, tacks, staples, etc.) held within a magazine 14 into a workpiece. The fastener driver 10 includes an inner cylinder 18 and a moveable piston 22 positioned within the cylinder 18 (see FIG. 1B). The fastener driver 10 further includes a driver blade 26 that is attached to the piston 22 and moveable therewith. The fastener driver 10 does not require an external source of air pressure, but rather includes an outer storage chamber cylinder 30 of pressurized gas in fluid communication with the inner cylinder 18. In the illustrated embodiment, the inner cylinder 18 and moveable piston 22 are positioned within the storage chamber cylinder 30. With reference to FIG. 1B, the driver 10 further includes a fill valve assembly 34 coupled to the storage chamber cylinder 30. When connected with a source of compressed gas, the fill valve assembly 34 permits the storage chamber cylinder 30 to be refilled with compressed gas if any prior leakage has occurred. The fill valve assembly 34 may be configured as a Schrader valve, for example.

With reference to FIG. 1B, the inner cylinder 18 and the driver blade 26 define a driving axis 38. During a driving cycle, the driver blade 26 and piston 22 are moveable between a top-dead-center (TDC) (i.e., retracted) position and a driven or bottom-dead-center (BDC) (i.e., extended) position. The fastener driver 10 further includes a lifting assembly 42, which is powered by a motor 46, and which is operable to move the driver blade 26 from the BDC position to the TDC position.

In operation, the lifting assembly 42 drives the piston 22 and the driver blade 26 toward the TDC position by energizing the motor 46. As the piston 22 and the driver blade 26 are driving toward the TDC position, the gas above the piston 22 and the gas within the storage chamber cylinder 30 is compressed. Prior to reaching the TDC position, the motor 46 is deactivated and the piston 22 and the driver blade 26 are held in a ready position, which is located between the TDC and the BDC positions, until being released by user activation of a trigger 48. When released, the compressed gas above the piston 22 and within the storage chamber cylinder 30 drives the piston 22 and the driver blade 26 toward the BDC position, thereby driving a fastener into the workpiece. A power source (e.g., a battery pack 106) is coupled to a battery pack interface 110 (e.g., a battery attachment portion) near the end of the handle portion 92. The battery pack 106 is electrically connectable to the motor 46 for supplying electrical power to the motor 46.

Figure 2:
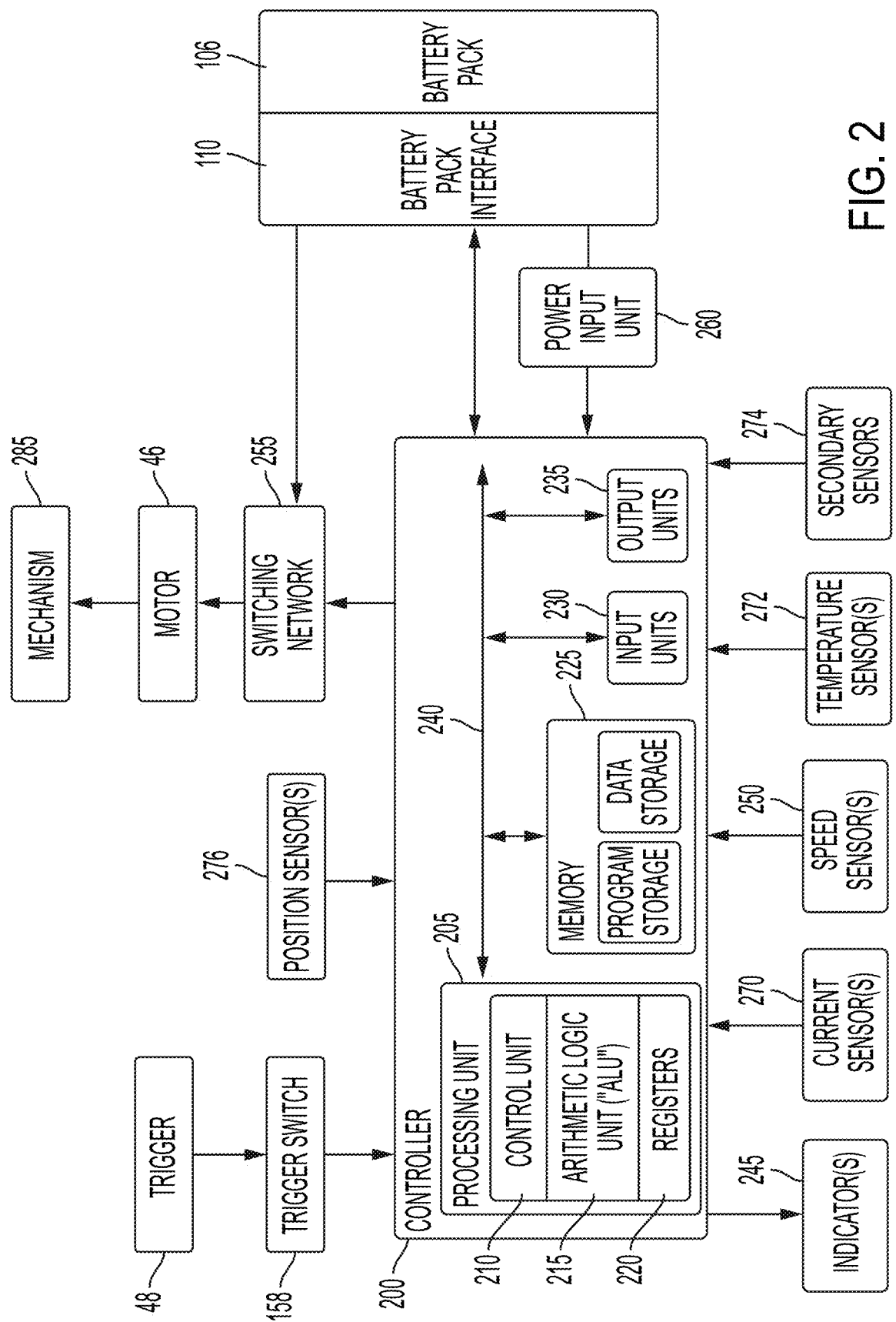
FIG. 2 illustrates a block diagram of a controller for the power tool of FIGS. 1A-1B in accordance with embodiments described herein.

A controller 200 for the fastener driver 10 is illustrated in FIG. 2. The controller 200 is electrically and/or communicatively connected to a variety of modules or components of the fastener driver 10. For example, the illustrated controller 200 is connected to indicators 245, a current sensor 270, a speed sensor 250, a temperature sensor 272, secondary sensor(s) 274 (e.g., a voltage sensor, an accelerometer, a workpiece contact sensor, etc.), a position sensor 276, the trigger 48 (via a trigger switch 158), a power switching network 255, and a power input unit 260.

The controller 200 includes a plurality of electrical and electronic components that provide power, operational control, and protection to the components and modules within the controller 200 and/or fastener driver 10. For example, the controller 200 includes, among other things, a processing unit 205 (e.g., a microprocessor, an electronic processor, an electronic controller, a microcontroller, or another suitable programmable device), a memory 225, input units 230, and output units 235. The processing unit 205 includes, among other things, a control unit 210, an arithmetic logic unit ("ALU") 215, and a plurality of registers 220 (shown as a group of registers in FIG. 2), and is implemented using a known computer architecture (e.g., a modified Harvard architecture, a von Neumann architecture, etc.). The processing unit 205, the memory 225, the input units 230, and the output units 235, as well as the various modules connected to the controller 200 are connected by one or more control and/or data buses (e.g., common bus 240). The control and/or data buses are shown generally in FIG. 2 for illustrative purposes. The use of one or more control and/or data buses for the interconnection between and communication among the various modules and components would be known to a person skilled in the art in view of the embodiments described herein.

The memory 225 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 205 is connected to the memory 225 and executes software instructions that are capable of being stored in a RAM of the memory 225 (e.g., during execution), a ROM of the memory 225 (e.g., on a generally permanent basis), or another non-transitory computer readable medium such as another memory or a disc. Software included in the implementation of the fastener driver 10 can be stored in the memory 225 of the controller 200. The software includes, for example, firmware, one or more applications, program data, filters, rules, one or more program modules, and other executable instructions. The controller 200 is configured to retrieve from the memory 225 and execute, among other things, instructions related to the control processes and methods described herein. In other embodiments, the controller 200 includes additional, fewer, or different components.

The controller 200 drives the motor 46 to drive the piston 22 and the driver blade 26 in response to a user's actuation of the trigger 48. Depression of the trigger 48 actuates a trigger switch 158, which outputs a signal to the controller 200 to drive the motor 46, and therefore the piston 22 and the driver blade 26. In some embodiments, the controller 200 controls the power switching network 255 (e.g., a FET switching bridge) to drive the motor 46. For example, the power switching network 255 may include a plurality of high side switching elements (e.g., FETs) and a plurality of low side switching elements. The controller 200 may control each FET of the plurality of high side switching elements and the plurality of low side switching elements to drive each phase of the motor 46. For example, the power switching network 255 may be controlled to more quickly deaccelerate the motor 46. In some embodiments, the controller 200 monitors a rotation of the motor 46 (e.g., a rotational rate of the motor 46, a velocity of the motor 46, a position of the motor 46, and the like) via the speed sensor 250. The motor 46 may be configured to drive a mechanism 285 (e.g., the piston 22, the driver blade 26, etc.).

The indicators 245 are also connected to the controller 200 and receive control signals from the controller 200 to turn on and off or otherwise convey information based on different states of the fastener driver 10. The indicators 245 include, for example, one or more light-emitting diodes (LEDs), or a display screen. The indicators 245 can be configured to display conditions of, or information associated with, the fastener driver 10. For example, the indicators 245 can display information relating to an operational state of the fastener driver 10, such as a mode or speed setting. The indicators 245 may also display information relating to a fault condition, or other abnormality of the fastener driver 10. In addition to or in place of visual indicators, the indicators 245 may also include a speaker or a tactile feedback mechanism to convey information to a user through audible or tactile outputs. In some embodiments, the indicators 245 display information related to a braking operation or a clutch operation (e.g., an electronic clutch operation) of the controller 200. For example, one or more LEDs are activated when the controller 200 is performing a clutch operation.

The battery pack interface 110 is connected to the controller 200 and is configured to couple with a battery pack 106. The battery pack interface 110 includes a combination of mechanical (e.g., a battery pack receiving portion) and electrical components configured to and operable for interfacing (e.g., mechanically, electrically, and communicatively connecting) the fastener driver 10 with the battery pack 106. The battery pack interface 110 is coupled to the power input unit 260. The battery pack interface 110 transmits the power received from the battery pack 106 to the power input unit 260. The power input unit 260 includes active and/or passive components (e.g., voltage step-down controllers, voltage converters, rectifiers, filters, etc.) to regulate or control the power received through the battery pack interface 110 and to the controller 200. In some embodiments, the battery pack interface 110 is also coupled to the power switching network 255. The operation of the power switching network 255, as controlled by the controller 200, determines how power is supplied to the motor 46.

The current sensor 270 senses a current provided by the battery pack 106, a current associated with the motor 46, or a combination thereof. In some embodiments, the current sensor 270 senses at least one of the phase currents of the motor. The current sensor 270 may be, for example, an inline phase current sensor, a pulse-width-modulation-center-sampled inverter bus current sensor, or the like. The speed sensor 250 senses a speed of the motor 46. The speed sensor 250 may include, for example, one or more Hall effect sensors. In some embodiments, the temperature sensor 272 senses a temperature of the switching network 255, the battery pack 106, the motor 46, the mechanism 285, or a combination thereof. The position sensor 276 senses a position of the mechanism 285 (e.g., the piston 22, the driver blade 26, and/or the lifting assembly 42). The position sensor 276 may be an absolute position sensor, such as an optical or mechanical rotary encoder, a magnetic position sensor, a capacitive position sensor, an inductive sensor, or the like.

Figure 3:
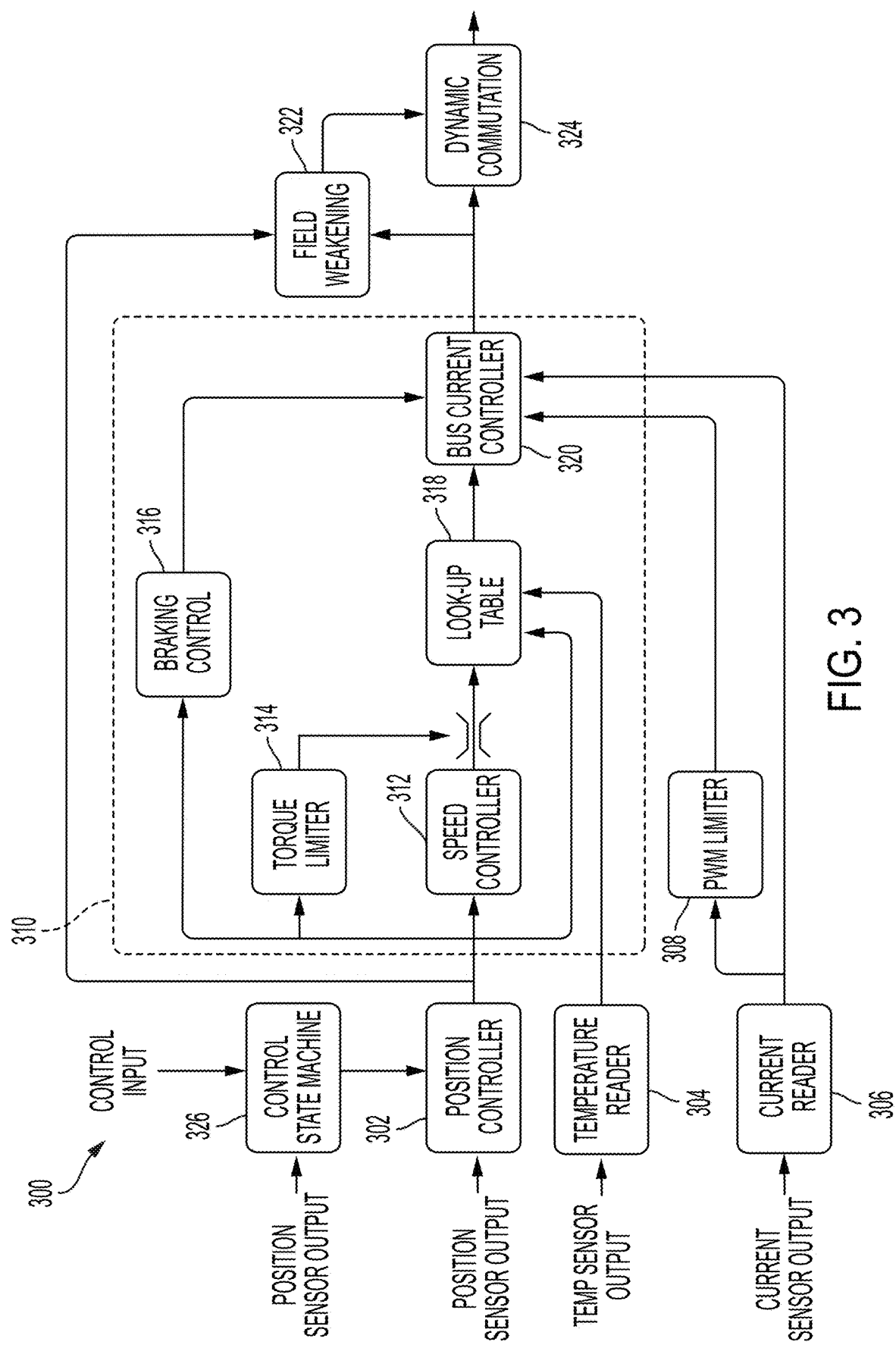
FIG. 3 illustrates a block diagram of a control architecture implemented by the controller of FIG. 2 in accordance with embodiments described herein.

The controller 200 is configured to monitor operating characteristics of the fastener driver 10 to drive the motor 46. For example, FIG. 3 provides a block diagram of a control architecture 300 implemented by the controller 200. The control architecture 300 includes, among other things, a position controller 302, a temperature reader module 304, a current reader module 306, a pulse width modulation (PWM) limiter 308, a field weakening module 322, a dynamic commutation module 324, a control state machine 326, and a driving algorithm 310. The driving algorithm 310 includes, among other things, software and applications used to drive the motor 46, such as a speed controller 312, a torque limiter module 314, a braking control module 316, a look-up table 318, and a bus current controller 320. The control architecture 300 of FIG. 3 is merely an example. In other embodiments, functions of the various modules and controllers may be combined or separated into additional modules.

The control state machine 326 sets a position command based on the position of the mechanism 285 (as indicated by the position sensor 276) and based on a control input (e.g., actuation of the trigger 48, detection of the presence of a workpiece based on a signal from a workpiece contact sensor). For example, when the mechanism 285 reaches a ready-to-fire position (e.g., a first position) and the trigger 48 is actuated, the control state machine 326 sets the position command to a striker drop position command. When the mechanism 285 reaches the striker drop position (e.g., a second position), the control state machine 326 sets the position command to a striker re-mesh position command. When the mechanism 285 reaches the striker re-mesh position (e.g., a third position), the control state machine 326 sets the position command to a ready to fire position command, completing the control cycle.

The position controller 302 receives the position command from the control state machine 326 and receives the position of the mechanism 285 from the position sensor 276. The position controller 302 compares the position command from the control state machine 326 to the actual position of the mechanism 285. If the actual position of the mechanism 285 is less than the commanded position, the position controller 302 outputs a positive speed command. If the actual position of the mechanism 285 is greater than or equal to the commanded position, the position controller 302 outputs a zero speed command. Accordingly, when the actual position of the mechanism 285 is at or exceeds the position command provided by the control state machine 326, the fastener driver 10 does nothing until the control state machine 326 catches up or a fault condition is corrected.

The temperature reader module 304 receives temperature signals from the temperature sensor 272 indicative of a temperature of the fastener driver 10. For example, the temperature reader module 304 receives temperature signals indicative of a temperature of the mechanism 285. In some embodiments, the temperature reader module 304 receives temperature signals indicative of a temperature of the motor 46 and/or the switching network 255. The temperature reader module 304 converts the temperature signal to a temperature value that is then provided to the driving algorithm 310. In some embodiments, the temperature signals from the temperature sensor 272 are provided directly to the driving algorithm 310. The temperature signals may be used by the driving algorithm 310 to improve torque repeatability over a wide temperature range.

The current reader module 306 receives current signals from the current sensor 270 indicative of the current of the motor 46. The current reader module 306 converts the received current signal to a current value (e.g., a voltage indicative of the current) that is then provided to the driving algorithm 310. In some embodiments, the current signals from the current sensor 270 are provided directly to the driving algorithm 310.

The PWM limiter 308 receives the current of the motor 46 from the current reader module 306. The PWM limiter 308 limits the maximum PWM ratio command used to drive the motor 46 to prevent low voltage conditions on the switching network 255 (e.g., gate drivers). The PWM ratio command limit is provided to the bus current controller 320.

Figure 4:
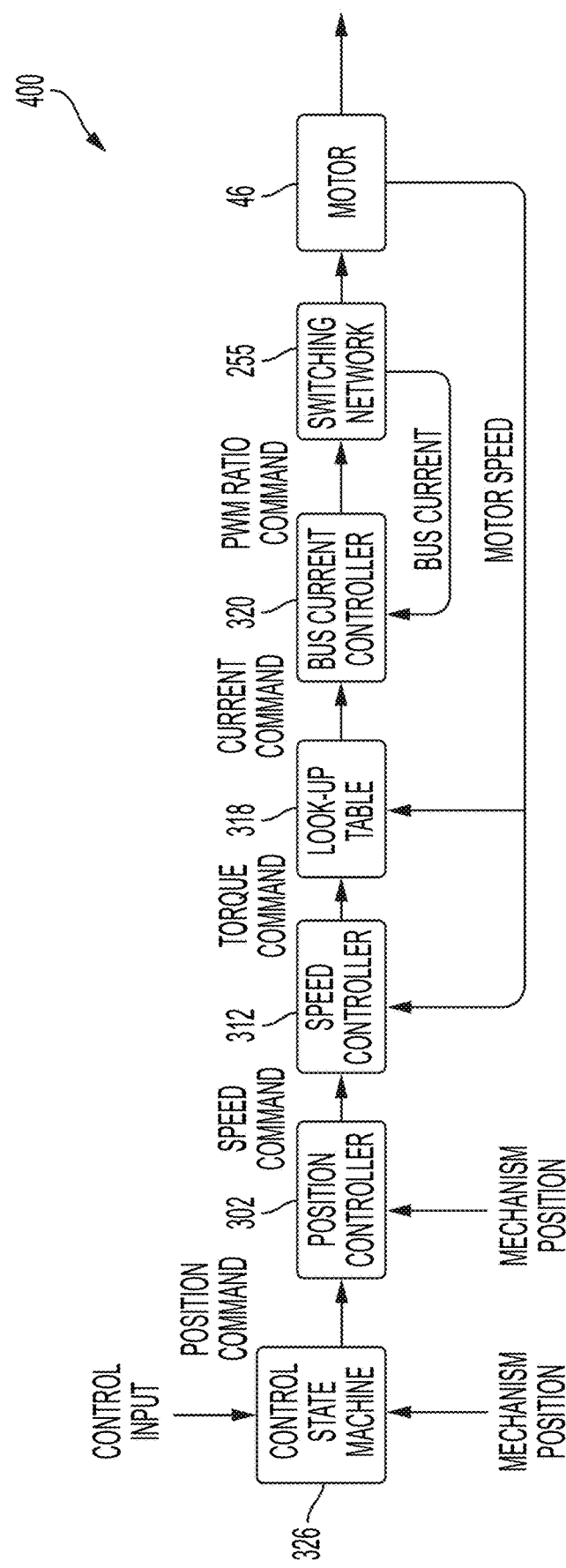
FIG. 4 illustrates a block diagram of a control block included in the control architecture of FIG. 3 in accordance with embodiments described herein.

FIG. 4 provides a block diagram of a control block 400 for control of the motor 46. The control state machine 326 outputs a position command based on the position of mechanism 285 and a control input (e.g., actuation of the trigger 48, detection of the presence of a workpiece based on a signal from a workpiece contact sensor, etc.). The position controller 302 receives the position command from the control state machine 326 and compares the position command to the actual position of the mechanism 285. When the position of the mechanism 285 is less than the position indicated by the position command, the position controller 302 outputs a positive speed command. When the position of the mechanism 285 is greater than or equal to the position indicated by the position command, the position controller 302 outputs a zero speed command.

The speed controller 312 receives a speed command from the position controller 302. Additionally, the speed controller 312 receives a speed of the motor 46 (as indicated by speed sensor 250). The speed controller 312 compares the speed command provided by the position controller 302 with the detected speed of the motor 46 to determine a torque at which to drive the motor 46. For example, if the motor speed is less than the speed command, the speed controller 312 outputs a torque command (e.g., a torque value) to increase the speed of the motor 46. If the motor speed is greater than the speed command, the speed controller 312 outputs a torque command to decrease the speed of the motor 46. If the motor speed is equal to the speed command, the speed controller 312 outputs a torque command to maintain the speed of the motor 46.

The torque command and the motor speed are provided to the look-up table 318. The torque command and the motor speed are compared to the look-up table 318 to determine a current command, such as a current value or bus current value at which to drive the motor 46. The current command is provided to the bus current controller 320. The bus current controller 320 then compares the current command to the measured bus current (e.g., the measured current of the motor 46 as provided by the current reader module 306). The bus current controller 320 drives the switching network 255 with a PWM ratio command (e.g., a PWM duty cycle ratio command) based on this comparison. For example, if the current command is less than the measured bus current, the bus current controller 320 decreases the PWM duty cycle at which the switching network 255 is driven. If the current command is greater than the measured bus current, the bus current controller 320 increases the PWM duty cycle at which the switching network 255 is driven. If the current command is equal to the measured bus current, the bus current controller 320 maintains the PWM duty cycle at which the switching network 255 is driven.

Figure 5:
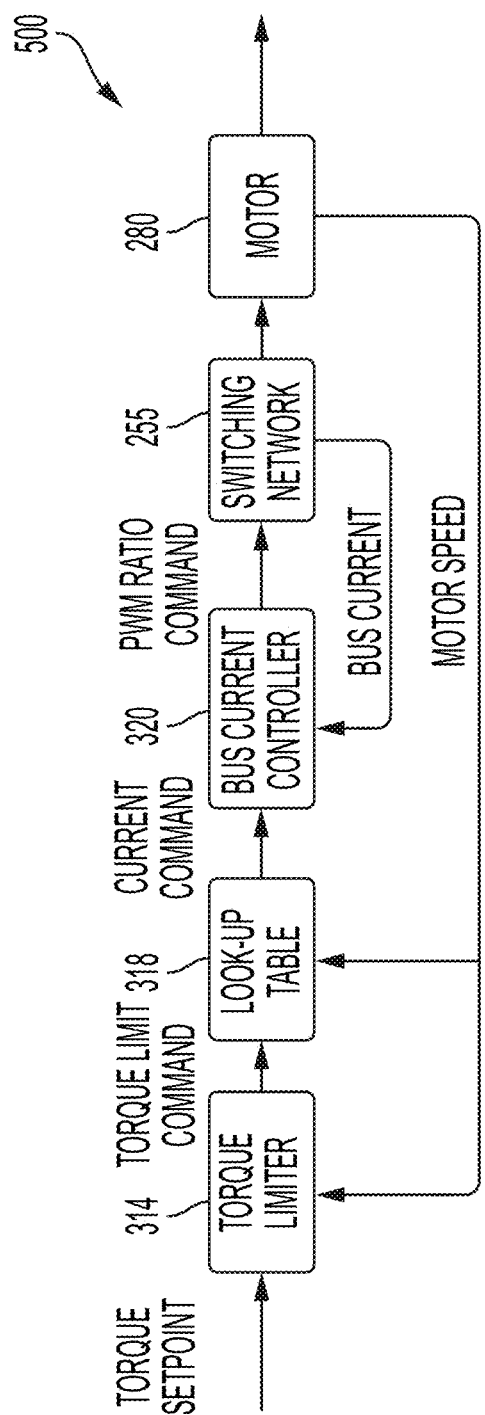
FIG. 5 illustrates a block diagram of another control block included in the control architecture of FIG. 3 in accordance with embodiments described herein.

In some embodiments, the torque limiter module 314 limits the torque command provided by the speed controller 312. FIG. 5 provides a block diagram of a control block 500 for limiting the torque command. A torque setpoint is provided to the torque limiter module 314. The torque setpoint may be a predetermined value stored in the memory 225 to protect the mechanism 285 from an over-torque condition. In some embodiments, the torque setpoint is a function of the lifter position (e.g., position of the piston 22) that varies throughout the cycle of the fastener driver 10.

The torque limiter module 314 limits the torque based on, for example, an estimated absorption energy of the motor 46. The absorption energy is estimated based on the principle of balancing the mechanical flywheel energy of the motor 46 and the mechanism 285 with the available absorption energy of the components within the fastener driver 10. For example, the torque setpoint is selected to limit the stress on the various components of the fastener driver 10 in situations of a fastener jam (e.g., a nail jam) or misalignment of the mechanism 285.

Figure 6A:
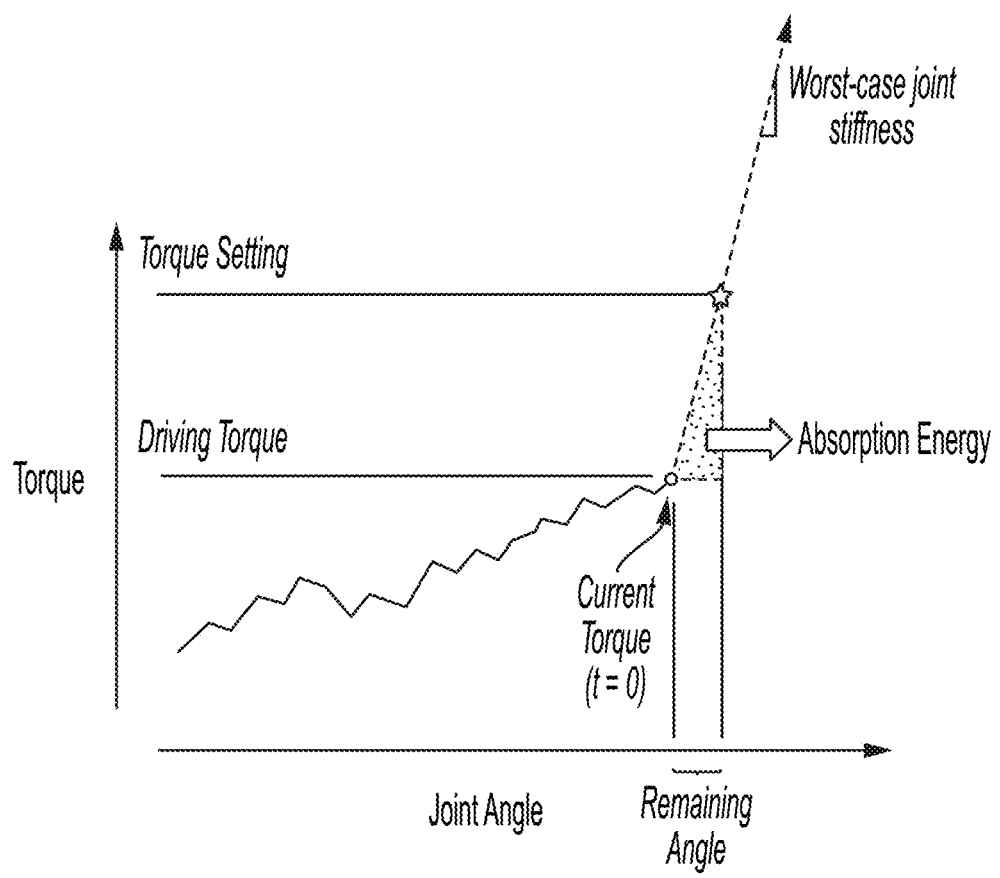
FIGS. 6A-6B illustrate graphs for measuring the absorption energy of a motor in accordance with embodiments described herein.

The absorption energy of the fastener is the integral of torque with respect to angle, and the net absorption energy of the fastener is the absorption energy minus the energy delivered by the torque of the motor 46. FIG. 6A provides an example of the absorption energy when the motor torque remains constant after joint. Equation 1 provides the absorption energy balanced with the flywheel energy:

$$\frac{1}{2}J\omega^2 = \frac{(T_s - T_d)^2}{2k_{joint}} \quad \text{[Equation 1]}$$

where:
J—fastener driver-reflected inertia from the perspective of the motor (kg-m²)
ω—motor velocity (rad/s)
$T_s$—torque setpoint (Nm)
$T_d$—driving torque (Nm)
$k_{joint}$—joint stiffness (Nm/rad)

When the torque limit is set to the driving torque, Equation 1 can be rearranged such that the torque limit is set based on the motor speed, the torque setpoint, driver fastener inertia, and joint stiffness, as shown in Equation 2:

$$T_{limit} = T_d = T_s - \sqrt{jk_{joint}}\omega \quad \text{[Equation 2]}$$

where:
$T_{limit}$—torque limit (Nm)

Figure 6B:
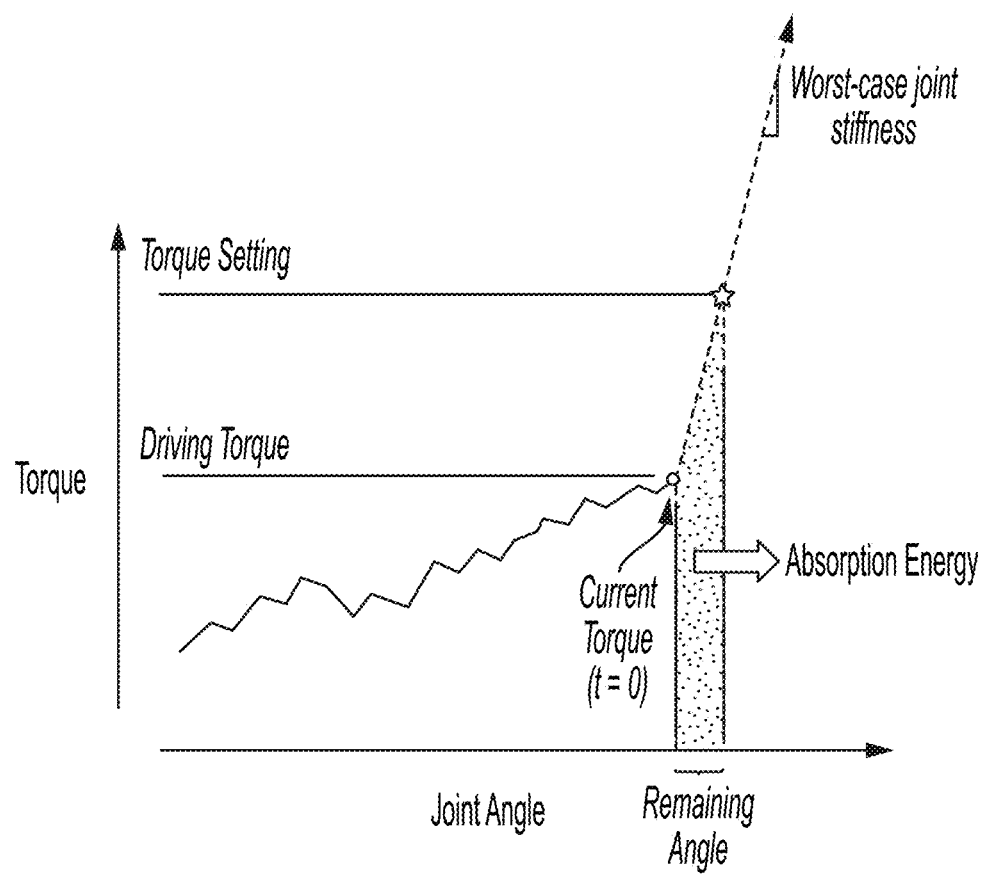

In another example, all of the absorption energy of the piston 22 and the driver blade 26 is used to stop the motor 46. When the fastener is driven into a workpiece, the motor 46 returns the piston 22 and the driver blade 26 to its original position to reload for a new operation (e.g., moves the driver blade 26 and piston 22 from the BDC position to the TDC position). Accordingly, the motor 46 is de-energized the instant the fastener is secured (e.g., the driver blade 26 is in the BDC position), and negative torque is introduced in applying a brake. The absorption energy is absorbed back into the driver blade 26 and piston 22 (e.g., as binding energy). FIG. 6B provides an example of the absorption energy when the motor 46 is de-energized. Equation 3 provides the absorption energy balanced with the flywheel energy.

$$\frac{1}{2}J\omega^2 = \frac{T_s^2 - T_d^2}{2k_{joint}} \quad \text{[Equation 3]}$$

When the torque limit is set to the driving torque, Equation 3 can be rearranged such that the torque limit is set based on the motor speed, the torque setpoint, drill inertia, and joint stiffness, as shown in Equation 4:

$$T_{limit} = T_d = \sqrt{T_s^2 - jk_{joint}\omega^2} \quad \text{[Equation 4]}$$

Figure 7:
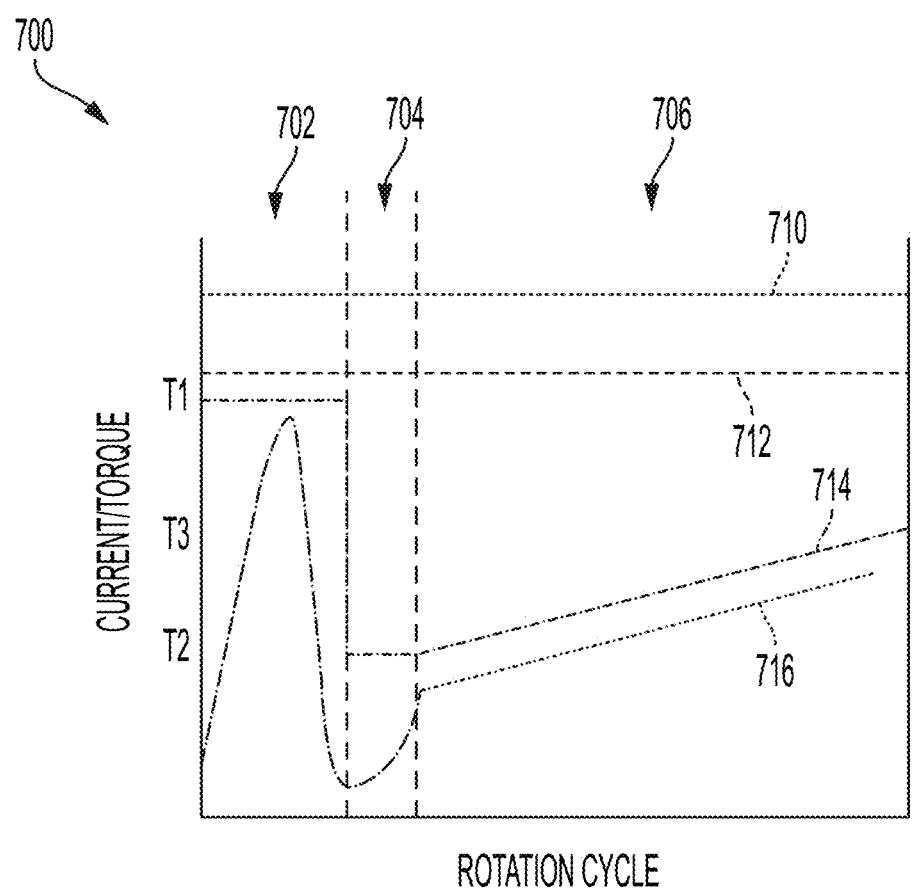
FIG. 7 illustrates a graph of a dynamic torque limiter in accordance with embodiments described herein.

In another example, the torque limit is dynamic as a function of the system position. FIG. 7 provides a graph 700 illustrating the torque limit as a function of the position of the piston 22. The graph 700 includes a system limit torque 710, an e-clutch torque setting 712, a torque limit 714 set by the torque limiter module 314, and an operational torque 716 indicative of the torque as the fastener driver 10 operates (e.g., a motor current provided to the motor 46). Within a first region 702, the piston is fully compressed and the driver blade 26 drops to secure a fastener in the workpiece. At this point, the torque limit 714 is at its highest value T1.

Within the second region 704, lifter lugs within the lifting assembly 42 are re-meshed with striker teeth within the lifting assembly 42. At this point, the torque limit 714 is at its lowest value T2. The torque limit 714 in the second region 704 limits stresses applied by the lifter lugs and the striker teeth when they are not aligned and the system experiences a binding event.

Within the third region 706, the piston 22 begins to compress partially to complete the reload cycle and prepare the fastener driver 10 to drive the next fastener. The torque limit 714 raises with the operational torque 716 to reload the piston 22 until the torque limit 714 reaches an intermediate or medium value T3.

Returning to FIG. 3, if the torque command is greater than the torque limit, the torque limit is instead provided to the look-up table 318. Control of the motor 46 is then continued using the torque limit as the torque command, as shown in FIG. 5.

Figure 8:
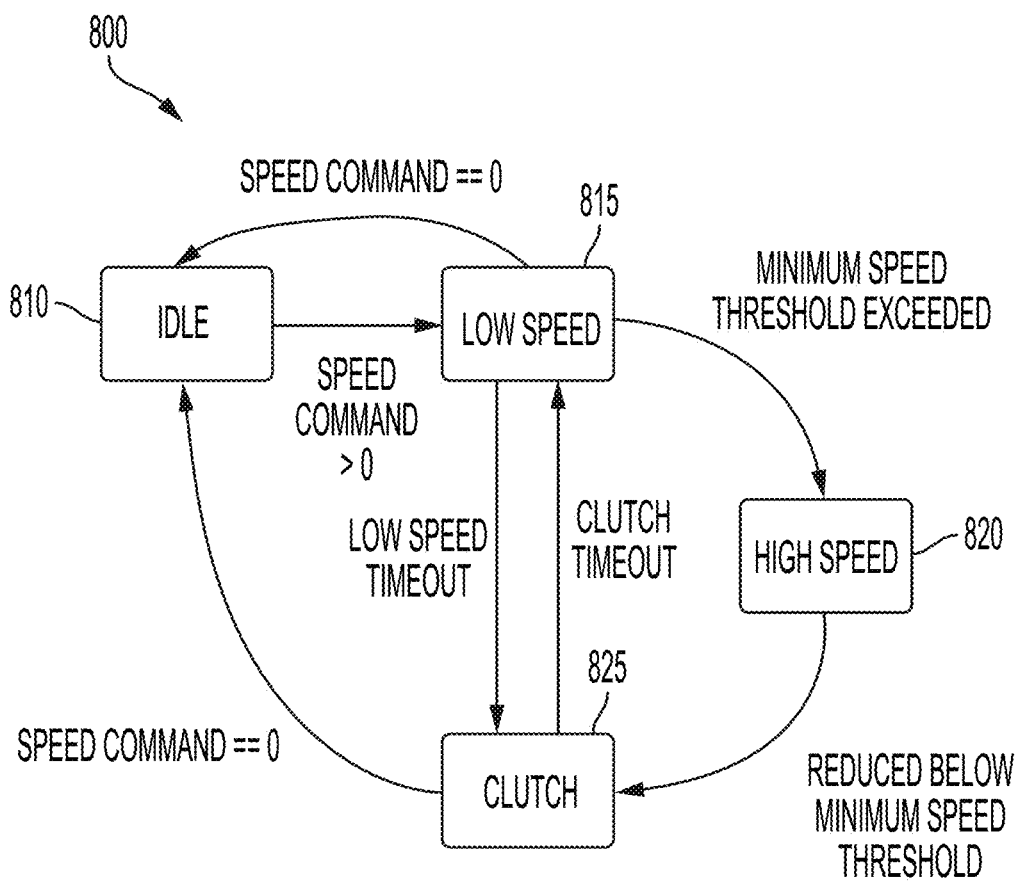
FIG. 8 illustrates a state machine block diagram for an electronic clutch in accordance with embodiments described herein.

In some embodiments, the PWM ratio command provided by the bus current controller 320 is overridden by the braking control module 316. For example, based on the motor speed sensed by the speed sensor 250, the braking control module 316 may determine to brake the motor 46. FIG. 8 provides a state diagram 800 illustrating operation of the fastener driver 10, as performed by the controller 200.

When the speed command of the motor 46 is set to 0 (e.g., when the trigger 48 is not actuated), the controller 200 is in an idle mode (block 810). When in the idle mode, the controller 200 monitors for actuation of the trigger 48, and the switching network 255 is placed in a high impedance state to prevent power transfer from the battery pack 106 to the motor 46. When the trigger 48 is actuated (e.g., when the speed command is greater than 0), the controller 200 proceeds to block 815 and operates the motor 46 according to a low speed mode (e.g., a first operating mode, a first speed setting, etc.). The low speed mode may be, for example, an operating mode associated with beginning of driving the motor 46 when the motor 46 was fully stopped. While in the low-speed mode, the controller 200 monitors the speed of the motor 46 as provided by the speed sensor 250. In some embodiments, while in the low-speed mode, the speed controller 312 is bypassed, and the motor 46 is controlled such that the torque output of the speed controller 312 is equal to the torque setpoint. If the speed of the motor 46 increases above or equal to a minimum speed threshold, the controller 200 proceeds to block 820. In some embodiments, the minimum speed threshold has a value of between 500 rotations per minute ("RPM") and 3000 RPM. In some embodiments, the minimum speed threshold has a value of approximately 1800 RPM. However, if the speed of the motor 46 remains below the minimum speed threshold for a low speed timeout period (e.g., a first predetermined time period), the controller 200 instead proceeds to block 825. If the speed command is set to zero (0) at any point (e.g., the trigger 48 is de-actuated), the controller 200 transitions back to the idle mode (block 810).

When the speed of the motor 46 exceeds or is equal to the minimum speed threshold, the controller 200 proceeds to block 820 and operates in a high speed mode (e.g., a second operating mode, a second speed setting). While in the high speed mode, the controller 200 drives the motor 46 according to received speed commands while within the set torque limits. The speed controller 312 is active, and the torque limiter module 314 may limit the torque output of the speed controller 312, which may reduce speed for clutch settings or when a significant load is applied. For example, when a high load state is detected based on the speed of the motor 46, the torque output of the speed controller 312 is limited.

When the speed of the motor 46 drops below the minimum speed threshold while operating in the high speed mode, the controller 200 proceeds to block 825 and operates in a clutch mode. In some embodiments, hysteresis can be used such that different speed thresholds are used to control transitions from the low speed mode and high speed mode. Additionally, when the controller 200 operates in the low speed mode (block 815) for a predetermined time period, the controller 200 proceeds to block 825 and operates in the clutch mode. While in the clutch mode, the controller 200 limits the current of the motor 46. For example, the current command provided to the bus current controller 320 by the look-up table 318 is overwritten by a low current command. In some embodiments, the low current command corresponds to a current value low enough to maintain engagement of the motor 46 with a related geartrain, but does not overcome geartrain friction. This results in a zero torque value of the lifting assembly 42. The low current command is maintained for a clutch timeout period, at which point the controller 200 returns to block 815 and operates in the low speed mode. If the trigger 48 is de-actuated while the controller 200 is in the clutch mode, the controller 200 returns to block 810 and operates in the idle mode. Additionally, in some instances, due to the clutch timeout period and the low speed timeout period, the controller 200 may alternate between the low speed mode at block 815 and the clutch mode at block 825 indefinitely until the trigger 48 is de-actuated. In some instances, the current of the motor 46 is limited by reducing the duty cycle of the PWM used to drive the motor 46. In some embodiments, the clutch timeout period and the low speed timeout period have values between 5 milli-seconds and 100 milli-seconds. In some embodiments, the clutch timeout period and the low speed timeout period have values of approximately 15 milli-seconds.

Returning to FIG. 3, the field weakening module 322 is configured to improve torque capability at high speeds when the back-electromotive force ("EMF") of the motor 46 causes the drive to become voltage limited. Field weakening may be applied by identifying the relationship between motor current, motor torque, and motor speed at a steady state. This relationship may be used to correct nominal field weakening. In some embodiments, the field weakening module 322 is disabled.

Figure 9:
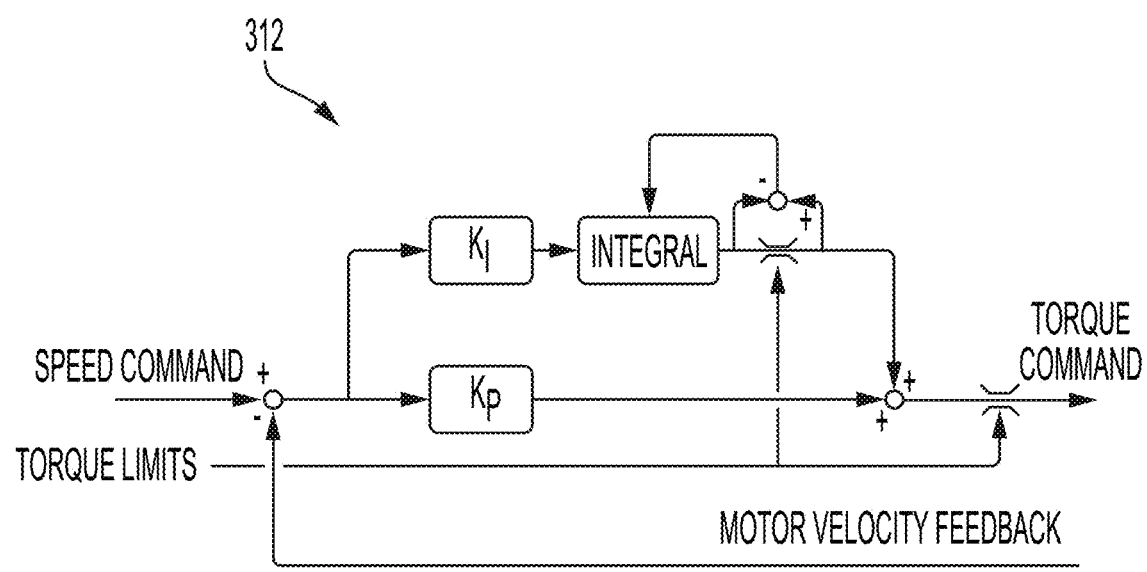
FIG. 9 illustrates a block diagram of a speed controller in accordance with embodiments described herein.

FIG. 9 illustrates an example block diagram of the speed controller 312. Equation 5 provides an example model for determining a torque command based on the motor speed:

$$T_C + b\omega + J\frac{d\omega}{dt} = T_{drive}$$ [Equation 5]

Equation 6 provides a simplified transfer function of the model of Equation 5:

$$\frac{\Omega(s)}{T_{drive}(s)} = \frac{1}{Js+b}$$ [Equation 6]

The torque command output by the speed controller 312 is locked to the upper torque limit any time the controller 200 is operating in the low speed mode. When the controller 200 is in the clutch mode, the torque command is overwritten downstream. However, the speed controller 312 continues operation. The illustrated speed controller 312 includes two gains: a proportional gain $K_P$ and an integral gain $K_I$.

Figure 10:
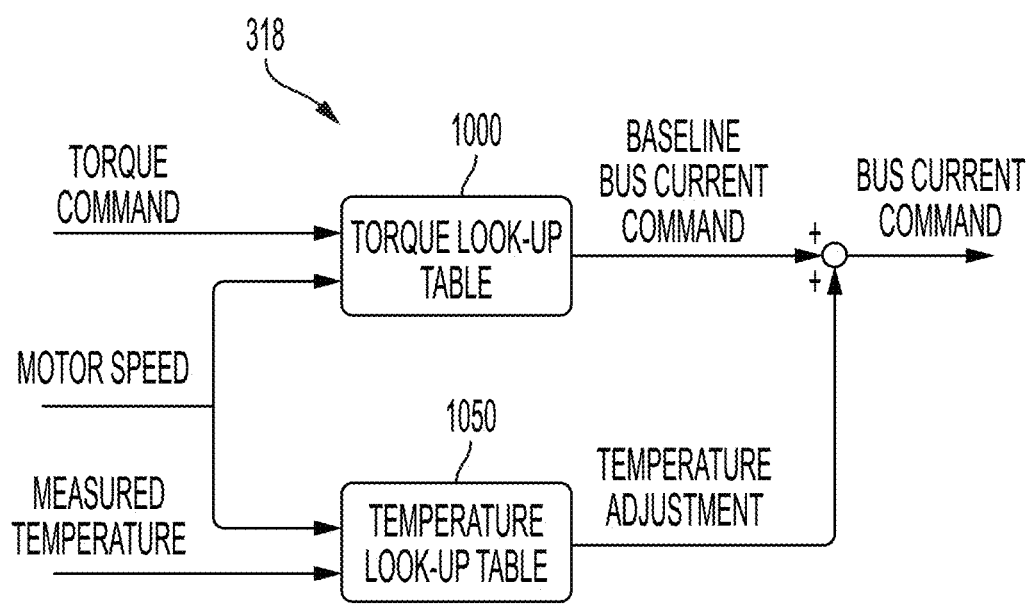
FIG. 10 illustrates a block diagram of a look-up table operation in accordance with embodiments described herein.

FIG. 10 illustrates an example block diagram of the look-up table 318. The torque command from the speed controller 312 is compared to the motor speed at a torque look-up table 1000. The torque look-up table 1000 (e.g., a torque-velocity-current look-up table) outputs a baseline bus current command. Additionally, the motor speed is compared to the measured temperature, as provided by the temperature reader module 304, at a temperature look-up table 1050. The output of the temperature look-up table 1050 is a temperature adjustment output. The temperature adjustment output is applied to the baseline bus current command to create the bus current command provided to the bus current controller 320.

In some embodiments, rather than using the look-up table 318, the torque command is converted to the bus current command using a slope-intercept method. The slope-intercept method converts torque to current independent of the motor speed and the temperature. For a given gear ratio, a slope and an intercept are provided to convert the torque to a current command.

Figure 11:
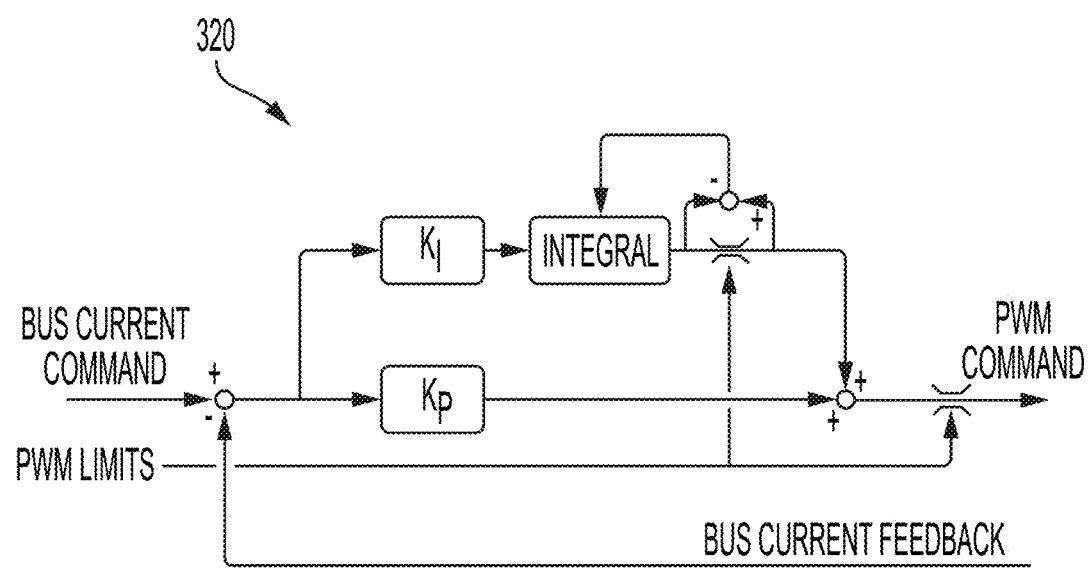
FIG. 11 illustrates a block diagram of a bus current controller in accordance with embodiments described herein.

FIG. 11 illustrates an example block diagram of the bus current controller 320. The bus current controller 320 outputs a PWM ratio command signal based on the bus current command from the look-up table 318. Equation 7 provides an example model for determining a PWM ratio command signal based on the bus current:

$$R_{eq}i_{batt} + L_{eq}\frac{di_{batt}}{dt} + K_e\omega = V_{batt}d_{PWM}$$ [Equation 7]

If velocity is constant relative to the electrodynamics and the battery voltage is constant, the model of Equation 7 becomes a transfer function defined by Equation 8:

$$\frac{I_{batt}(s)}{d_{PWM}(s)} = V_{batt}\frac{1}{L_{eq}s + R_{eq}}$$ [Equation 8]

When the controller 200 is operating in the low speed mode or the high speed mode, the bus current controller 320 operates normally. When in the idle mode or when braking, the PWM ratio command output is overridden to zero. When in the clutch mode, the bus current command is overridden to another value to overcome cogging torque and reduce system backlash. Additionally, in some embodiments, when transitioning from the clutch mode to the low speed mode, the PWM ratio command is overwritten to a value that increases jerk of the fastener driver 10. Additionally, the bus current controller 320 may limit the PWM ratio command output to prevent bus current overshoot (e.g., an overcurrent condition). The illustrated bus current controller 320 includes two gains: a proportional gain $K_P$ and an integral gain $K_I$.

Figure 12:
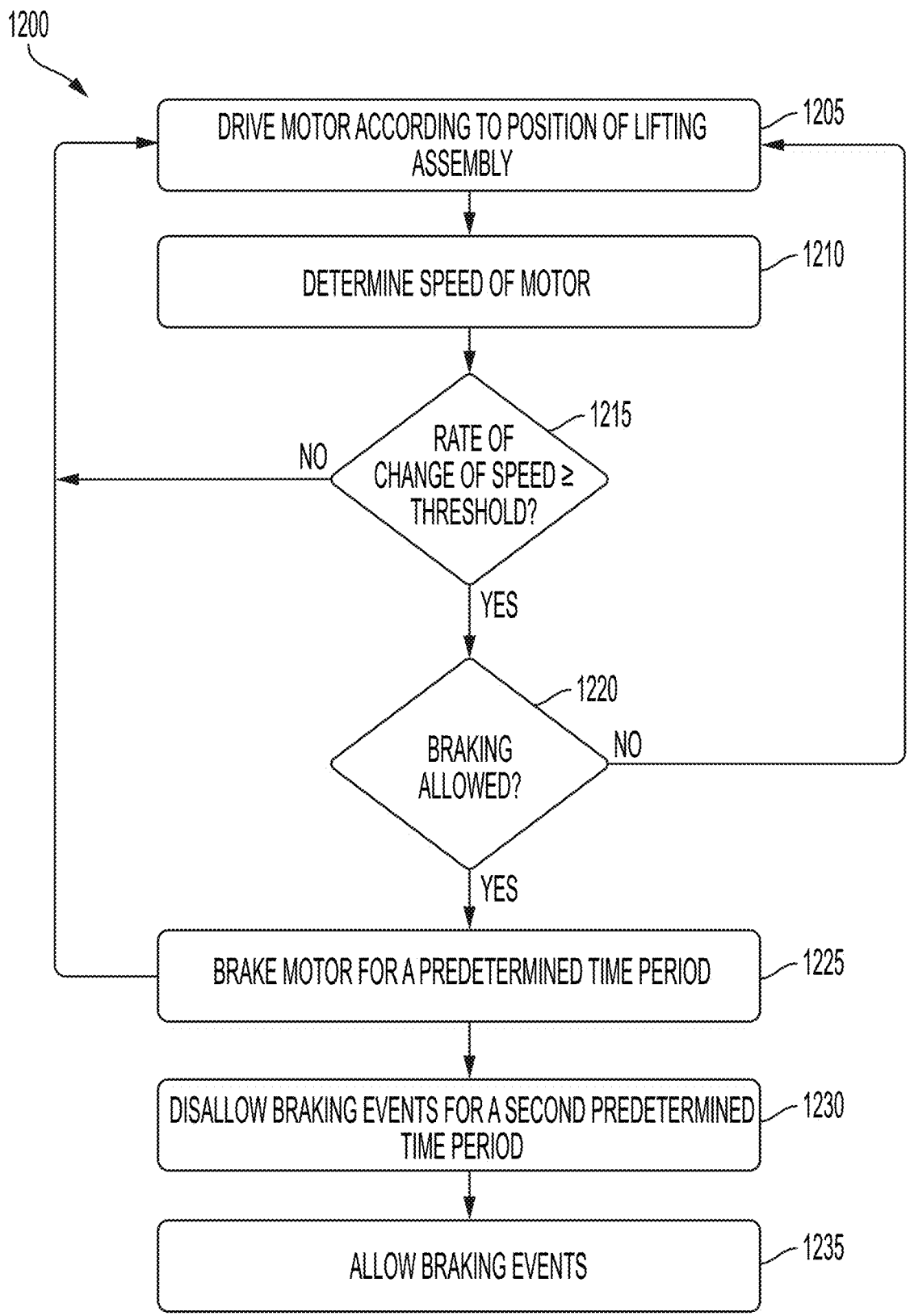
FIG. 12 illustrates a block diagram of a method performed by the controller of FIG. 2 in accordance with embodiments described herein.

FIG. 12 provides a method 1200 for controlling the motor 46. The method 1200 may be performed by the controller 200. At block 1205, the controller 200 drives the motor 46 according to the position of the lifting assembly 42. For example, the controller 200 drives the motor 46 according to the high speed mode while the trigger 48 is actuated and based on the position of the lifting assembly 42. At block 1210, the controller 200 receives speed signals from the speed sensor 250 indicative of the speed of the motor 46. In other embodiments, the controller 200 determines the speed of the motor 46 based on current signals from the current sensor 270.

At block 1215, the controller 200 determines whether a rate of change of the speed of the motor 46 is greater than or equal to a speed drop threshold (e.g., a speed rate of change threshold). If the rate of change of the speed of the motor 46 is less than the speed drop threshold, the controller 200 returns to block 1205 and continues to drive the motor 46 according to the position of the lifting assembly 42. For example, the speed of the motor 46 experiences minor variations in speed. If the rate of change of the speed of the motor 46 is greater than or equal to the speed drop threshold (for example, a reduction in speed of 400-600 RPM over a 10 ms period of time), the controller 200 proceeds to block 1220. In some embodiments, the speed drop threshold corresponds to a change in rotations per minute ("RPM") of between 100 RPM and 2000 RPM during the first time period. In some embodiments, the speed drop threshold corresponds to a change in RPM of approximately 400 RPM during the first time period. In some embodiments, the controller 200 monitors the speed of the motor 46 over a first period of time to determine the rate of change, such as between 5 milli-seconds and 100 milli-seconds. In some embodiments, the first period of time is approximately 10 milli-seconds.

At block 1220, the controller 200 determines whether braking of the motor 46 is allowed. For example, to prevent false braking triggers, braking of the motor 46 may be disallowed for a predetermined period of time after a braking event is completed, as braking causes deceleration of the motor that may result in a reduction of speed that satisfies the speed drop threshold a second time. By disallowing recurrent braking events, the controller 200 avoids false braking events. If braking events are not allowed, the controller 200 returns to block 1205 and continues to drive the motor 46 according to the position of the lifting assembly 42. If braking events are allowed, the controller proceeds to block 1225. In some embodiments, braking events are not disallowed, and block 1220 (and blocks 1230 and 1235) may be removed from the method 1200.

At block 1225, the controller 200 brakes the motor 46 for a predetermined time period. For example, the controller 200 controls the switching network 255 to electronically brake the motor 46. Once the predetermined period of time is satisfied, the controller 200 disallows braking events (at block 1230) and returns to block 1205. The controller 200 disallows braking events for a second predetermined time period to prevent false braking triggers. Once the second predetermined time period is satisfied, the controller 200 allows braking events to be performed (at block 1235). In some embodiments, braking is disabled at low speeds (e.g., 2000 RPM or fewer).

Figure 13A:
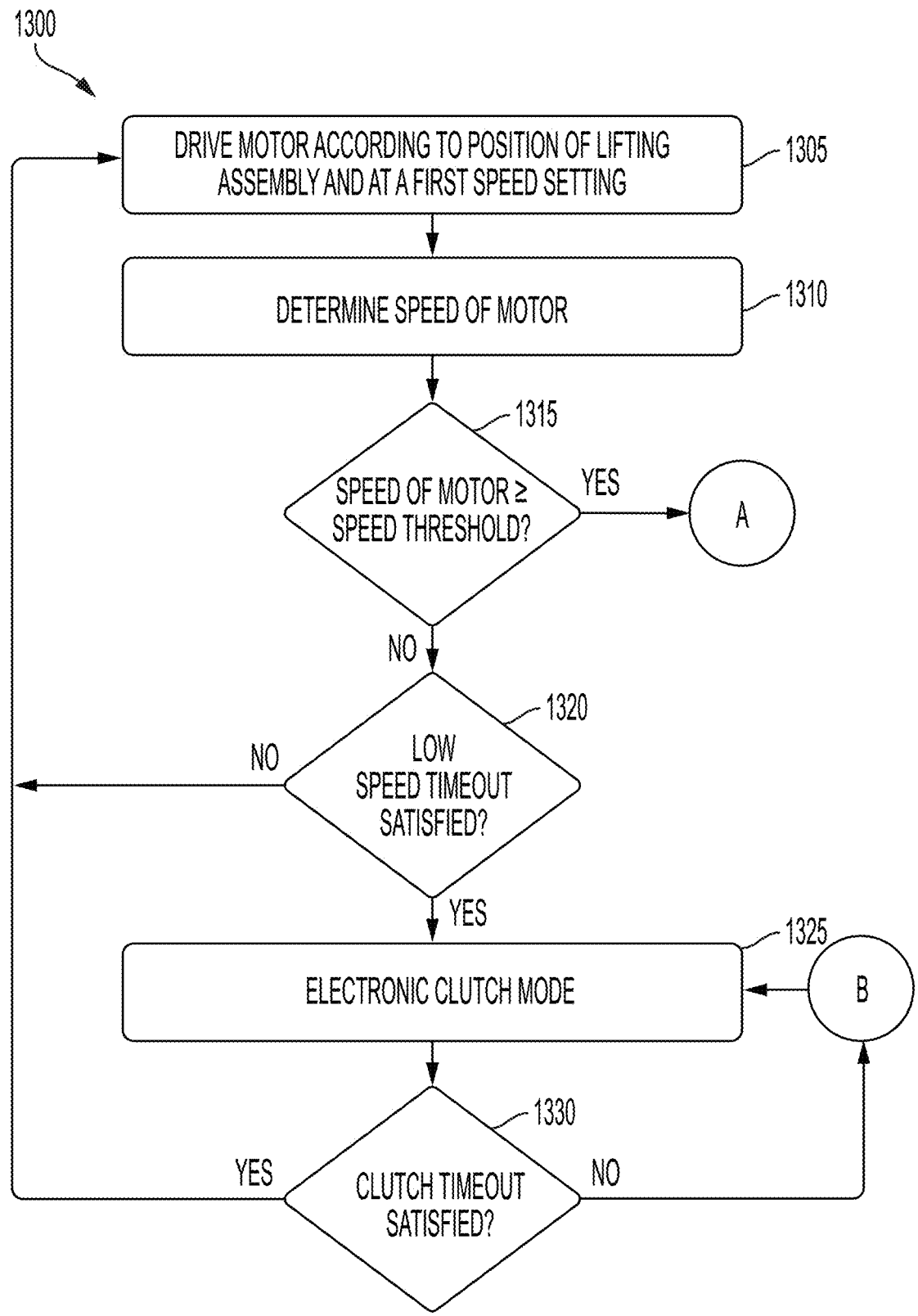
FIGS. 13A-13B illustrates a block diagram of another method performed by the controller of FIG. 2 in accordance with embodiments described herein.
Figure 13B:
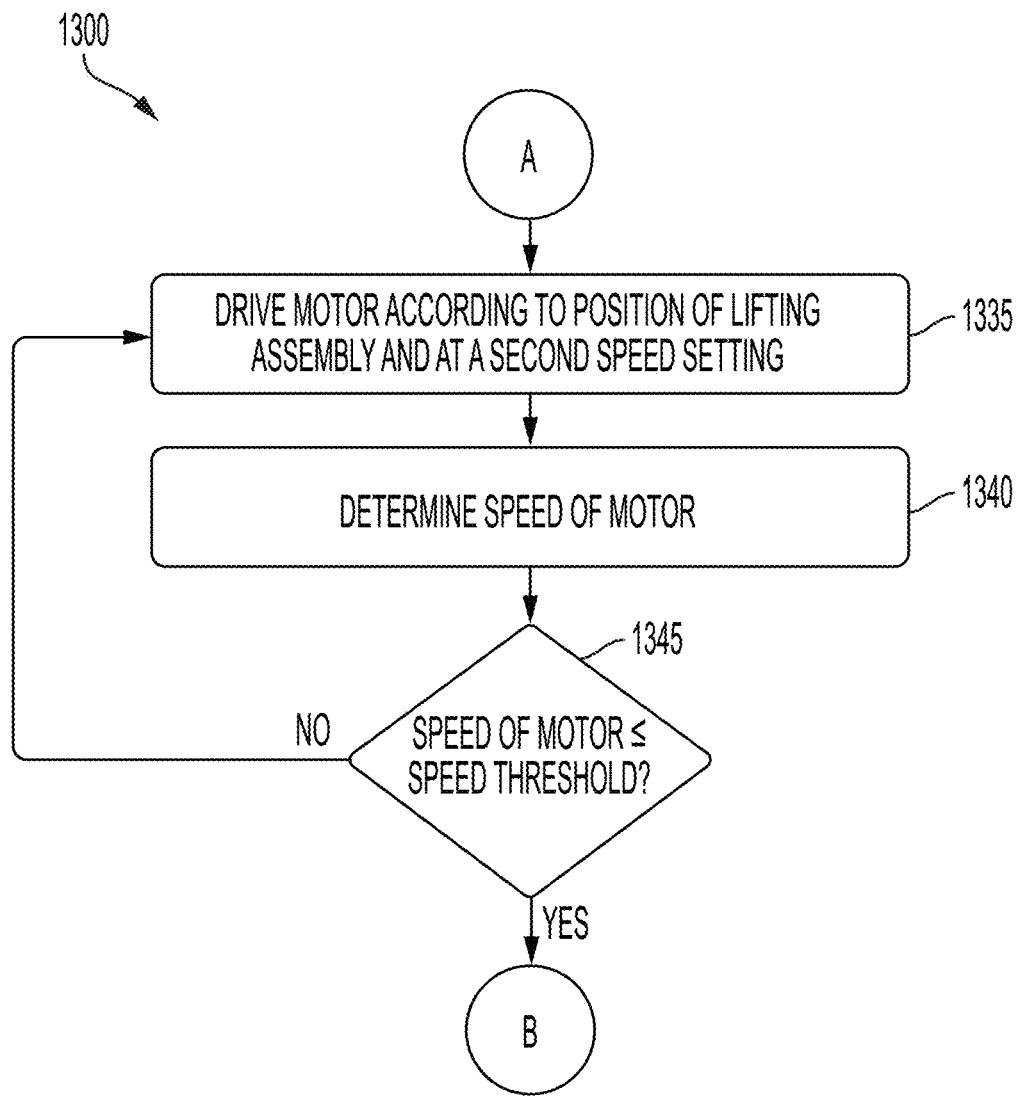

FIGS. 13A-13B provide a method 1300 for controlling the motor 46. The method 1300 may be performed by the controller 200. The method 1300 may be performed in parallel to the method 1200 of FIG. 12. At block 1305, the controller 200 drives the motor 46 according to the position of the lifting assembly 42 and at a first speed setting. For example, the controller 200 drives the motor 46 according to the low speed mode while receiving a speed command from the trigger 48 and based on the position of the lifting assembly 42. At block 1310, the controller 200 determines the speed of the motor 46. For example, in some embodiments, the controller 200 receives speed signals from the speed sensor 250 indicative of the speed of the motor 46. In other embodiments, the controller 200 determines the speed of the motor 46 based on current signals from the current sensor 270.

At block 1315, the controller 200 determines whether the speed of the motor 46 is greater than or equal to a speed threshold. If the speed of the motor 46 is greater than or equal to the speed threshold, the controller 200 proceeds to block 1335 (see FIG. 13B). If the speed of the motor 46 is less than the speed threshold, the controller 200 determines whether the low speed timeout threshold has been satisfied (block 1320). If the low speed timeout threshold is not satisfied, the controller 200 returns to block 1305 and continues to drive the motor 46 according to the position of the lifting assembly 42.

If the low speed timeout threshold is satisfied, the controller 200 proceeds to block 1325 and enters the electronic clutch mode. In the electronic clutch mode, the controller 200 drives the motor 46 according to a low current command (e.g., reduced PWM duty cycle), as previously described. At block 1330, the controller 200 determines whether the clutch timeout period is satisfied. If the clutch timeout period is satisfied, the controller 200 returns to block 1305 and drives the motor 46 according to the first speed setting. If the clutch timeout period is not satisfied, the controller 200 returns to block 1325 and continues to operate in the electronic nclutch mode. In some embodiments, the clutch timeout period corresponds to between 10 and 100 milli-seconds. In some embodiments, the clutch timeout period is approximately 35 milli-seconds.

Returning to block 1315, if the speed of the motor is greater than or equal to the speed threshold, the controller 200 proceeds to block 1335. At block 1335, the controller 200 drives the motor 46 according to the position of the lifting assembly 42 and at a second speed setting. In some embodiments, the second speed setting is the high speed mode. At block 1340, the controller 200 determines the speed of the motor 46. For example, in some embodiments, the controller 200 receives speed signals from the speed sensor 250 indicative of the speed of the motor 46. In other embodiments, the controller 200 determines the speed of the motor 46 based on current signals from the current sensor 270.

At block 1345, the controller 200 determines whether the speed of the motor 46 is less than or equal to the speed threshold. If the speed of the motor 46 is greater than the speed threshold, the controller 200 continues to drive the motor 46 according to the position of the lifting assembly 42 and at the second speed setting. If the speed of the motor 46 is less than or equal to the speed threshold, the controller 200 proceeds to block 1325 and enters the electronic clutch mode. For example, the method 1200 in FIG. 12 can cause a rapid slowdown of the motor 46 that causes the motor speed to become less than the speed threshold and the transition from the second speed setting to the electronic clutch mode.

To avoid distributed stopping positions throughout an operating cycle of the fastener driver 10, embodiments described herein provide for alternative stopping point biasing and dynamic error margins for control of the motor 46. For example, embodiments described herein may bias the stopping point of the motor 46 closer to the striker drop position, reducing time between the trigger pull and driving of a fastener. Additionally, the tolerance window may have a lower bound to avoid a double fire event (e.g., from about 30 degrees to about 5 degrees).

Figure 14:
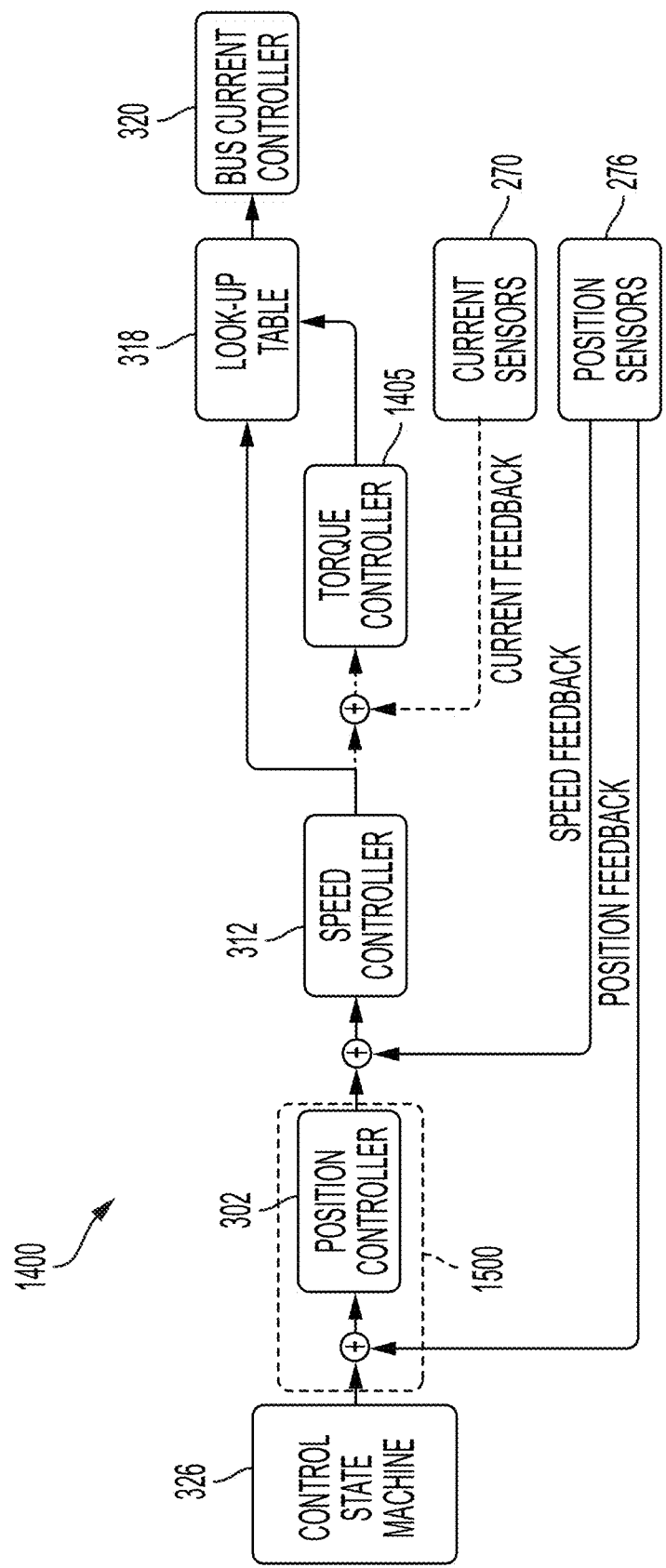
FIG. 14 illustrates a block diagram of another control block included in the control architecture of FIG. 3 in accordance with embodiments described herein.

FIG. 14 provides a block diagram of a control block 1400 for position control of the motor 46. The control state machine 326 outputs a position command based on the position of mechanism 285 (indicated by position feedback from the position sensors 276) and a control input (e.g., actuation of the trigger 48, detection of the presence of a workpiece based on a signal from a workpiece contact sensor, etc.). The position command is provided to a position control loop 1500, illustrated in FIG. 15 in more detail.

In some instances, there is a rollover point of the position sensor 276 when the position of the mechanism 285 wraps from 360° to 0°. This rollover position introduces a discontinuity in the control input from the position sensor 276 to the controller 200. The rollover point may result in an undesired stopping of the motor 46. The position control loop 1500 addresses the rollover point by aligning the rollover position with the window where the lifter and striker disengage while the striker drives the fastener into the workpiece. As position information is not needed during this period of the cycle, the rollover point is "hidden" so as to not impact operation of the fastener driver 10. In some instances, position signals from the position sensor 276 are corrected by using a linear slope and an offset transformation function to map the position signals to a continuous function (e.g., from zero to a set maximum value). Additionally, the input to the position controller 302 is switched such that the position controller 302 receives, for example, a fake or artificial position error and commands maximum output at the beginning of an operation cycle. By providing a fake position error and commanding maximum output, the motor 46 provides maximum effort at start-up and produces a fast time-to-fire. Additionally, a seamless transition to proportional control is provided when the control state machine 326 determines rollover has occurred and position error (e.g., the difference between the position command and the actual position of the mechanism 285) is calculated normally. Position error override also provides a means to abort slowdown during a reload cycle.

Figure 15:
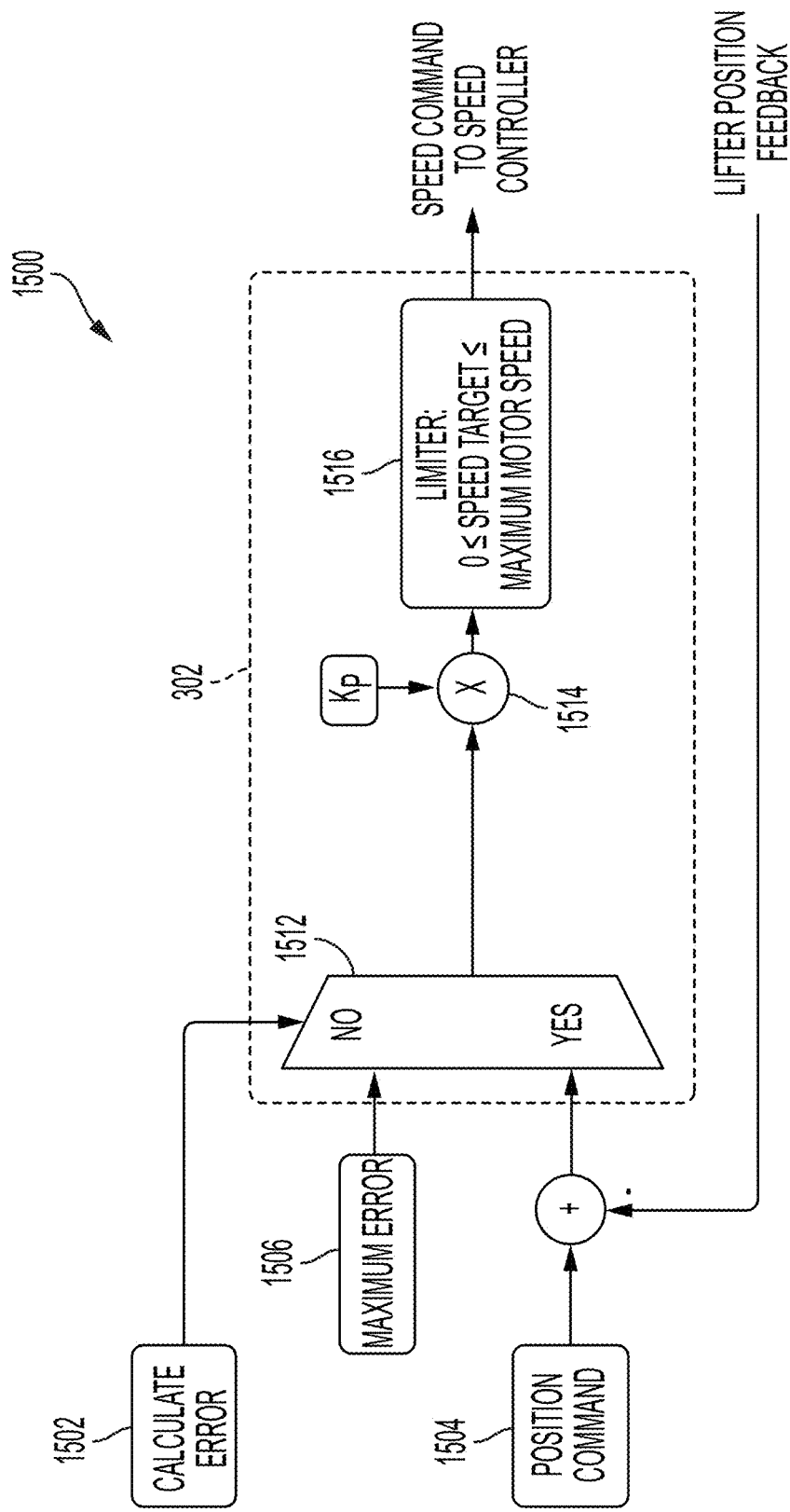
FIG. 15 illustrates a block diagram of a position control block in accordance with embodiments described herein.

As shown in FIG. 15, the position control loop 1500 includes a calculate error block 1502, a position command 1504, and a maximum error block 1506 provided to the position controller 302. During the beginning of an operation cycle, the position controller 302 refers to the maximum error block 1506 and outputs a maximum speed command. During other periods of time in the operation cycle, the position controller 302 refers to the position command 1504 and position feedback from the position sensor 276 (e.g., the actual position of the mechanism 285 indicated by position sensor 276). The position controller 302 implements instructions included in the calculate error block 1502 to determine the difference between the position command and the actual position of the mechanism 285. The position controller 302 then determines a speed command based on the difference between the position command and the actual position of the mechanism 285, as previously described.

The position controller 302 includes, for example, a multiplexer 1512, a gain module 1514, and a limiter module 1516. The multiplexer 1512 receives the error from the calculate error block 1502, the position command 1504 (summed with the position feedback), and the maximum speed command from the maximum error block 1506, and determines a speed command based on a current position of the motor 46. The speed command is multiplied with a proportional gain $K_P$. The limiter module 1516 ensures the speed command is set to a value between or equal to zero and the maximum allowed motor speed. When a speed command is above the maximum allowed motor speed, the limiter module 1516 reduces the speed command to the maximum allowed motor speed.

Returning to FIG. 14, the speed controller receives the speed command from the position controller 302. Additionally, the speed controller 312 receives a speed of the motor 46. In the example of FIG. 14, the speed controller 312 determines the speed of the motor 46 based on position signals received from the position sensors 276, for example, by determining a derivative of the position signals. However in other instances, the speed controller 312 may receive the speed of the motor 46 as indicated by speed sensor 250. The speed controller 312 compares the speed command provided by the position controller 302 with the detected speed of the motor 46 to determine a torque at which to drive the motor 46. For example, if the motor speed is less than the speed command, the speed controller 312 outputs a torque command to increase the speed of the motor 46. If the motor speed is greater than the speed command, the speed controller 312 outputs a torque command to decrease the speed of the motor 46. If the motor speed is equal to the speed command, the speed controller 312 outputs a torque command to maintain the speed of the motor 46.

In some instances, the torque command is provided to look-up table 318 to determine a current command for bus current controller 320, as previously described. In other instances, however, the control block 1400 includes a torque controller 1405. The torque controller 1405 receives the torque command from the speed controller 312 and a motor current of the motor 46 (indicated by the current sensors 270). In some embodiments, the torque controller 1405 determines a present torque of the motor 46 based on the motor current of the motor 46. The torque controller 1405 compares the torque command provided by the speed controller 312 with the detected torque of the motor 46 to determine whether to adjust the torque command provided to the look-up table 318. For example, if the motor torque is less than the torque command, the torque controller 1405 adjusts the torque command to increase the torque of the motor 46. If the motor torque is greater than the torque command, the torque controller 1405 adjusts the torque command to decrease the torque of the motor 46. If the motor torque is equal to the torque command, the torque controller 1405 maintains the value of the torque command provided by the speed controller 312.

Figure 16:
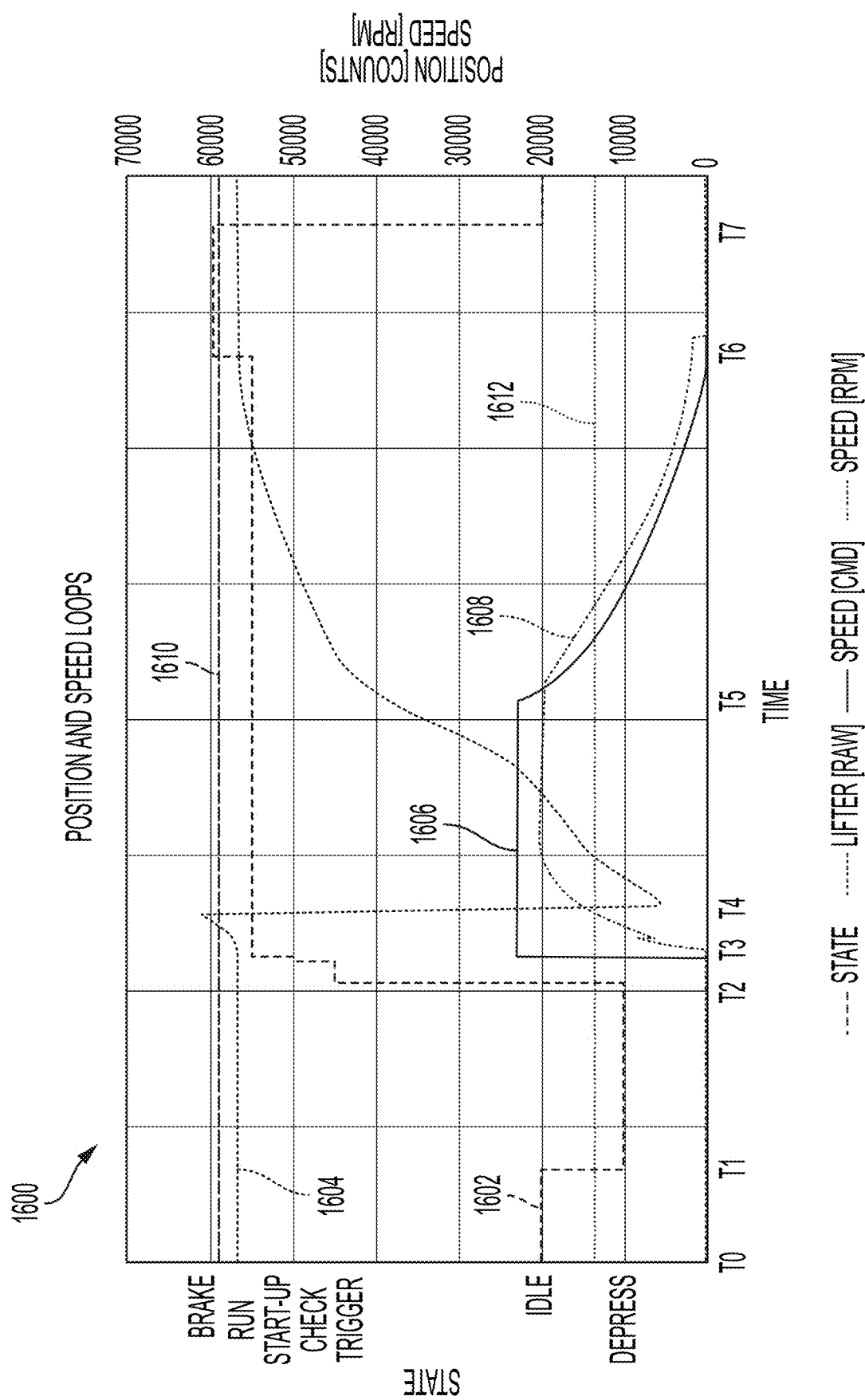
FIG. 16 is a graph illustrating positions of a motor and speed of a motor during an operation cycle of the power tool of FIGS. 1A-1B in accordance with embodiments described herein.

FIG. 16 illustrates a graph 1600 showing an operating cycle of the fastener driver 10. The graph 1600 includes a state function 1602 showing different states of the fastener driver 10, a position function 1604 showing a position of the mechanism 285, a speed command function 1606 showing the speed command provided by the speed controller 312, and a motor speed function 1608 showing the measured speed of the motor 46. The graph 1600 also includes the TDC position (indicated by dashed line 1610) and the BDC position (indicated by dotted line 1612).

From time T0 to T1, the controller 200 is in an idle state. While in the idle state, the controller 200 monitors for an input (e.g., monitors for actuation of the trigger 48) indicating initiation of an operating cycle. From time T1 to time T2, the fastener driver 10 is depressed onto a workpiece (detected by a workpiece contact sensor). At time T2, the trigger 48 is actuated, transitioning the controller 200 to a trigger detection state. In response to the trigger 48 being actuated, at time T3, the fastener driver 10 transitions to a start-up check mode and performs start-up check operations.

Once the start-up check operations are complete, the position controller 302 outputs a maximum speed command to the speed controller 312 (from T3 to T5). During this time period, the position controller 302 overrides received position signals and calculated errors. Additionally, the controller 200 shifts to a run state (at time T3). At time T4, the mechanism 285 is controlled to strike a fastener. The rollover point of the mechanism 285 is aligned with this operation. The controller 200 continues to drive the motor 46 from time T4 to time T6.

At time T5, the position controller 302 returns to normal operation and determines the speed command provided to the speed controller 312 based on the distance between the desired position of the mechanism 285 and the actual position of the mechanism 285. From time T5 to T6, the speed command decreases in value, decelerating the motor 46. At time T6, the controller 200 shifts to a braking state and brakes the motor 46 (from time T6 to time T7). At time T7, the controller 200 returns to the idle state.

Figure 17:
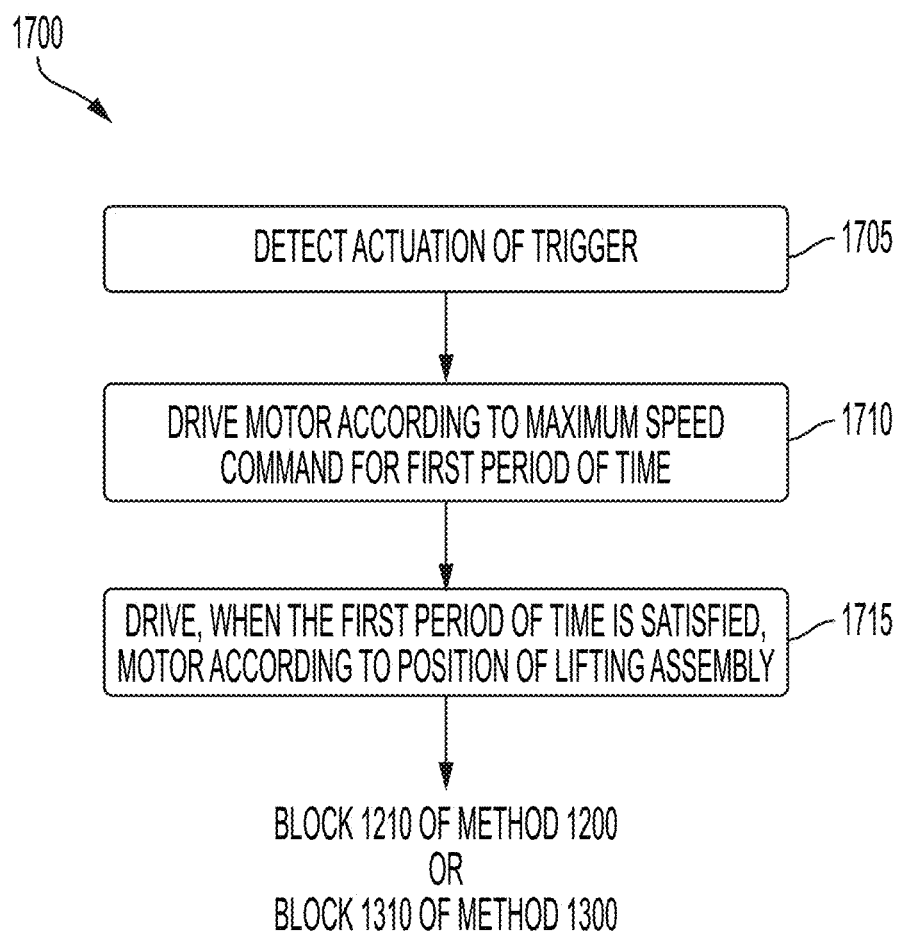
FIG. 17 illustrates a block diagram of another method performed by the controller of FIG. 2 in accordance with embodiments described herein.

FIG. 17 provides a method 1700 for controlling the motor 46. The method 1700 may be performed by the controller 200. At block 1705, the controller 200 detects actuation of the trigger 48. At block 1710, the controller 200 drives the motor 46 according to a maximum speed command for a first period of time. For example, at the beginning of an operating cycle, the position controller 302 provides a maximum speed command to the speed controller 312, regardless of the position of the mechanism 285.

When the first period of time is satisfied, at block 1715, the controller 200 drives the motor 46 according to the position of lifting assembly 42, as previously described. For example, the position controller 302 returns to normal operation and sets the speed command based on the difference between the position command from the control state machine 326 and the actual position of the mechanism 285 (indicated by the position sensors 276). In some embodiments, after performing block 1715, the controller 200 continues to block 1210 of method 1200 (see FIG. 12) or block 1310 of method 1300 (see FIG. 13). However, the position control described with respect to any of FIGS. 14-17 can also be implemented independently of the electronic clutch.

Thus, embodiments provided herein describe, among other things, systems and methods for an electronic clutch in a powered driver fastener. Various features and advantages are set forth in the following claims.

What is claimed is:

1. A fastener driver including an electronic clutch, the fastener driver comprising:
    a motor;
    a trigger;
    a lifting assembly operable to be moved by the motor;
    a position sensor configured to sense a position of the lifting assembly;
    a speed sensor configured to sense a speed of the motor; and
    a controller connected to the trigger, the motor, the position sensor, and the speed sensor, the controller configured to:
        provide, in response to actuation of the trigger and based on the position of the lifting assembly, power to the motor,
        receive speed signals from the speed sensor indicative of the speed of the motor,
        determine whether the speed of the motor has dropped by a speed drop threshold within a first period of time,
        activate, in response to determining that the speed of the motor has dropped by the speed drop threshold within the first period of time, the electronic clutch to electronically brake the motor for a second period of time, and
        provide, in response to the second period of time having passed, power to the motor.

2. The fastener driver of claim 1, wherein the controller is further configured to:
    determine, based on the speed of the motor and a speed command signal, a torque value at which to drive the motor;
    compare the torque value to a torque-velocity-current look-up table;
    determine, based on the comparison, a current value to provide to the motor; and
    provide the current value to the motor to drive the motor.

3. The fastener driver of claim 2, further comprising:
    a current sensor configured to provide current signals indicative of a current of the motor,
    wherein the controller is further configured to:
        receive, from the current sensor, the current signals indicative of the current of the motor,
        determine a pulse width modulation (PWM) duty cycle ratio based on the current of the motor and the current value, and
        drive the motor according to the PWM duty cycle ratio.

4. The fastener driver of claim 1, wherein the controller is further configured to:
    set a position command used to drive the motor to a first position command when the lifting assembly is at a first position,
    set the position command to a second position command when the lifting assembly is at a second position, and
    set the position command to a third position command when the lifting assembly is at a third position.

5. The fastener driver of claim 4, wherein the controller is further configured to:
    compare the position command to the position of the lifting assembly sensed by the position sensor, and
    provide, in response to the position of the lifting assembly being less than the position command, power to the motor.

6. The fastener driver of claim 1, wherein the controller is further configured to:
    determine a torque limit based on the position of the lifting assembly, and
    control the motor based in part on the torque limit.

7. The fastener driver of claim 1, further comprising:
    a temperature sensor configured to provide temperature signals indicative of a temperature of the lifting assembly,
    wherein the controller is further configured to:
        receive, from the temperature sensor, the temperature signals indicative of the temperature of the lifting assembly, and
        determine, based on the speed signals and the temperature signals, a torque value at which to drive the motor.

8. The fastener driver of claim 1, wherein the controller is configured to:
    detect a high load state of the motor based on the speed of the motor; and
    limit, in response to the high load state of the motor, a torque value at which to drive the motor.

9. The fastener driver of claim 1, wherein the controller is further configured to:

drive, in response to the second period of time having passed, the motor according to a low speed setting for a third period of time.

10. The fastener driver of claim 9, wherein the controller is further configured to:
electronically brake the motor in response to the third period of time having passed.

11. A method for operating a fastener driver including an electronic clutch, the method comprising:
providing, in response to actuation of a trigger and based on a position of a lifting assembly, power to a motor;
receiving speed signals from a speed sensor indicative of a speed of the motor;
determining whether the speed of the motor has dropped by a speed drop threshold within a first period of time;
activating the electronic clutch, in response to determining that the speed of the motor has dropped by the speed drop threshold within the first period of time, to electronically brake the motor for a second period of time; and
providing, in response to the second period of time having passed, power to the motor.

12. The method of claim 11, further comprising:
determining, based on the speed of the motor and a speed command, a torque value at which to drive the motor;
comparing the torque value to a torque-velocity-current look-up table;
determining, based on the comparison, a current value to provide to the motor; and
providing the current value to the motor to drive the motor.

13. The method of claim 12, further comprising:
receiving, from a current sensor, current signals indicative of a current of the motor;
determining a pulse width modulation (PWM) duty cycle ratio based on the current of the motor and the current value; and
driving the motor according to the PWM duty cycle ratio.

14. The method of claim 11, further comprising:
setting a position command used to drive the motor to a first position command when the lifting assembly is at a first position,
setting the position command to a second position command when the lifting assembly is at a second position, and
setting the position command to a third position command when the lifting assembly is at a third position.

15. The method of claim 14, further comprising:
comparing the position command to the position of the lifting assembly, and
providing, in response to the position of the lifting assembly being less than the position command, power to the motor.

16. The method of claim 11, further comprising:
determining a torque limit based on the position of the lifting assembly, and
controlling the motor based in part on the torque limit.

17. A power tool including an electronic clutch, the power tool comprising:
a motor;
a lifting assembly operable to be moved by the motor;
a speed sensor configured to sense a speed of the motor;
a position sensor configured to sense a position of the lifting assembly; and
a controller connected to the motor, the speed sensor, and the position sensor, the controller configured to:
drive, based on the position of the lifting assembly, the motor according to a first speed setting,
receive speed signals from the speed sensor indicative of the speed of the motor,
determine, while in the first speed setting, whether the speed of the motor is greater than or equal to a speed threshold,
drive, in response to the speed of the motor being greater than or equal to the speed threshold and based on the position of the lifting assembly, the motor according to a second speed setting,
determine, while in the second speed setting, whether the speed of the motor is less than the speed threshold, and
activate the electronic clutch, in response to determining that the speed of the motor is below the speed threshold, to drive the motor at a low current command for a first predetermined time period.

18. The power tool of claim 17, wherein the controller is further configured to:
drive, in response to the first predetermined time period having passed and based on the position of the lifting assembly, the motor according to the first speed setting.

19. The power tool of claim 18, wherein the controller is further configured to:
drive the motor according to the first speed setting for a second predetermined time period; and
drive, in response to determining that the second predetermined time period has passed, the motor at the low current command for the first predetermined time period.

20. The power tool of claim 17, wherein the controller is further configured to:
determine a torque limit based on the position of the lifting assembly, and
control the motor based in part on the torque limit.

* * * * *